(12) United States Patent
Ito et al.

(10) Patent No.: US 10,821,722 B2
(45) Date of Patent: Nov. 3, 2020

(54) CONTROL DEVICE, STORAGE MEDIUM, AND PRINTING METHOD

(71) Applicant: BROTHER KOGYO KABUSHIKI KAISHA, Nagoya (JP)

(72) Inventors: Tsuyoshi Ito, Nagoya (JP); Hirotoshi Maehira, Nagoya (JP); Masao Mimoto, Nagoya (JP); Yoshimitsu Taniguchi, Tajimi (JP); Shohei Ichikawa, Kasugai (JP); Kengo Noda, Inazawa (JP)

(73) Assignee: BROTHER KOGYO KABUSHIKI KAISHA, Nagoya (JP)

(*) Notice: Subject to any disclaimer, the term of this patent is extended or adjusted under 35 U.S.C. 154(b) by 0 days.

(21) Appl. No.: 16/351,790

(22) Filed: Mar. 13, 2019

(65) Prior Publication Data

US 2019/0299594 A1 Oct. 3, 2019

(30) Foreign Application Priority Data

Mar. 30, 2018 (JP) ................. 2018-066879

(51) Int. Cl.
  *B41J 2/17* (2006.01)
  *B41J 2/045* (2006.01)
  *B41J 11/00* (2006.01)
  *H04N 1/00* (2006.01)

(52) U.S. Cl.
  CPC ......... *B41J 2/04501* (2013.01); *B41J 11/008* (2013.01); *H04N 1/00331* (2013.01)

(58) Field of Classification Search
  None
  See application file for complete search history.

(56) References Cited

U.S. PATENT DOCUMENTS

| | | | |
|---|---|---|---|
| 5,847,721 A | 12/1998 | Ogata et al. | |
| 2010/0123750 A1 | 5/2010 | Hayashi et al. | |
| 2013/0028520 A1 | 1/2013 | Kondo et al. | |
| 2017/0282590 A1* | 10/2017 | Ozawa | B41J 2/2132 |

FOREIGN PATENT DOCUMENTS

| | | |
|---|---|---|
| JP | 5-225378 A | 9/1993 |
| JP | 8-244253 A | 9/1996 |
| JP | 2002-288589 A | 10/2002 |
| JP | 2010-120267 A | 6/2010 |
| JP | 2013-030090 A | 2/2013 |

* cited by examiner

*Primary Examiner* — Erica S Lin
(74) *Attorney, Agent, or Firm* — Merchant & Gould P.C.

(57) ABSTRACT

A control device for a printing execution unit, wherein, in a case where a character region and a non-character region are included in an overlap region which includes an upstream end of a partial region configured to be printed by a first partial printing, the printing execution unit is caused to print a print image by: forming a plurality of character dots, which are dots in the character region included in the overlap region, by one of the first partial printing and a second partial printing, and not forming the plurality of character dots by another of the first partial printing and the second partial printing; and forming some of a plurality of non-character dots, which are dots in the non-character region included in the overlap region, by the first partial printing, and forming other dots of the plurality of non-character dots by the second partial printing.

18 Claims, 10 Drawing Sheets

PATTERN DATA

RECORDING RATE

CONTROL DEVICE, STORAGE MEDIUM, AND PRINTING METHOD

CROSS-REFERENCE TO RELATED APPLICATIONS

This application claims priority from Japanese Patent Application No. 2018-066879 filed on Mar. 30, 2018, the entire contents of which are incorporated herein by reference.

TECHNICAL FIELD

The present disclosure relates to a control device for a printing execution unit including a printing head having a plurality of nozzles and a movement unit configured to move a printing medium relative to the printing head.

BACKGROUND

Related art discloses a printing apparatus configured to cause a printing head to scan so as to perform printing in a band unit. The printing apparatus is configured to execute an overlap printing of printing dot rows in a main scanning direction by using two or three nozzles so as to suppress banding. At this time, when an edge forming pixel of a character region is included in a dot row to be printed using the three nozzles, the printing apparatus prints the dot row by using the two nozzles.

However, according to the above technology, it may not be possible to sufficiently suppress a defect that a character is to be thickened due to the printing of the character using the two or more nozzles during the overlap printing.

SUMMARY

An aspect of the present disclosure provides a technology capable of suppressing a character from being thickened in a print image.

According to an aspect of the disclosure, there is provided a control device for a printing execution unit including: a printing head including a plurality of nozzles configured to discharge ink; a head drive unit configured to cause the printing head to discharge the ink and to form dots on a printing medium; and a movement unit configured to move the printing medium relative to the printing head in a moving direction, the control device including: a controller configured to perform: acquiring target image data; specifying a character region indicative of a character in a print image based on the target image data; and causing the printing execution unit to print the print image by using the target image data, the print image being printed by alternately executing, for a plurality of times, (i) a partial printing in which dots are formed by the printing head and (ii) moving of the printing medium by the movement unit, and the plurality of times of the partial printings including a first partial printing and a second partial printing, wherein the printing execution unit is caused to print the print image by: executing the first partial printing; moving the printing medium by a first movement amount after the first partial printing has been executed; and executing the second partial printing after the printing medium has been moved by the first movement amount, wherein dots are formed in an overlap region by both the first partial printing and the second partial printing, the overlap region including an upstream end, in the moving direction, of a partial region which is configured to be printed by the first partial printing, and wherein, in a case where the character region and a non-character region different from the character region are included in the overlap region, the printing execution unit is caused to print the print image by: forming a plurality of character dots, which are dots in the character region included in the overlap region, by one of the first partial printing and the second partial printing, and not forming the plurality of character dots by another of the first partial printing and the second partial printing; and forming some of a plurality of non-character dots, which are dots in the non-character region included in the overlap region, by the first partial printing, and forming other dots of the plurality of non-character dots by the second partial printing.

According to the above configuration, since an image in the character region of the overlap region is printed by one of the first partial printing and the second partial printing, it is possible to suppress the character in the character region from being thickened. Also, since an image in the non-character region of the overlap region is printed by both the first partial printing and the second partial printing, it is possible to suppress the banding from being generated in the non-character region.

In the meantime, the technology of the present disclosure can be implemented in a variety of forms, such as a printing apparatus, a control method of the printing execution unit, a printing method, a computer program for implementing functions of the apparatus and method, a storage medium having the computer program recorded therein, and the like.

DETAILED DESCRIPTION

A. First Illustrative Embodiment: A-1: Configuration of Printer 200

Figure 1:
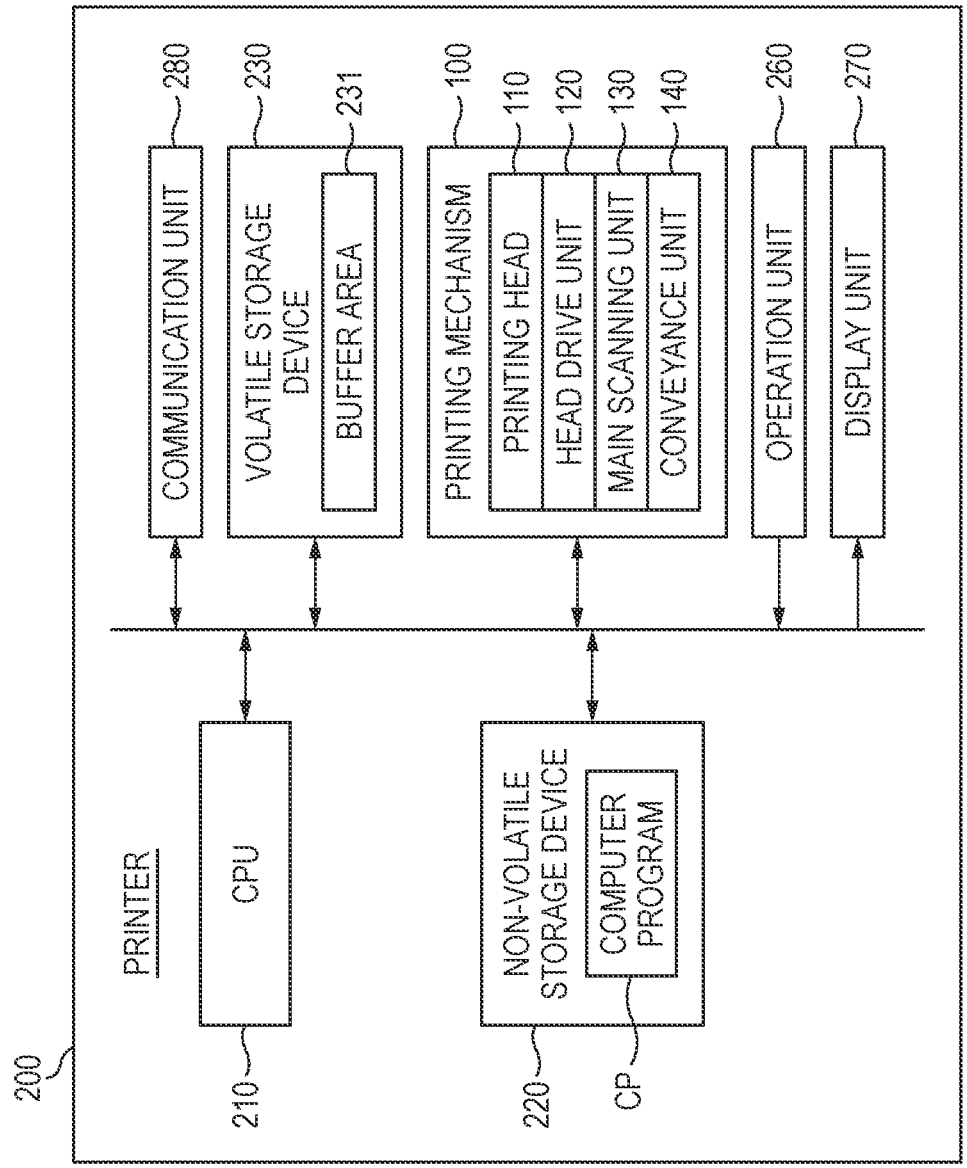
FIG. 1 is a block diagram depicting a configuration of an illustrative embodiment.

Hereinafter, an illustrative embodiment will be described. FIG. 1 is a block diagram depicting a configuration of an illustrative embodiment.

A printer 200 includes a printing mechanism 100, a CPU 210 as a control device for the printing mechanism 100, a non-volatile storage device 220 such as a hard disk drive, a volatile storage device 230 such as a hard disk and a flash memory, an operation unit 260 such as button and a touch panel for acquiring a user's operation, a display unit 270 such as a liquid crystal monitor, and a communication unit 280, for example. The printer 200 is communicatively connected to an external device, for example, a terminal device (not shown) of a user via the communication unit 280.

The volatile storage device 230 provides a buffer area 231 for temporarily storing therein a variety of intermediate data that are generated when the CPU 210 performs processing. In the non-volatile storage device 220, a computer program CP is stored. In the illustrative embodiment, the computer program CP is a control program for controlling the printer 200, and can be provided with being stored in the non-volatile storage device 220 upon shipment of the printer 200. Also, the computer program CP is provided to be downloaded from a server. Instead of this configuration, the computer program CP may be provided with being stored in a DVD-ROM or the like. The CPU 210 is configured to execute the computer program CP, thereby controlling the printing mechanism 100 to execute printing processing (which will be described later), for example.

The printing mechanism 100 is configured to perform printing by discharging respective inks (liquid droplets) of cyan (C), magenta (M), yellow (Y) and black (K). The printing mechanism 100 includes a printing head 110, a head drive unit 120, a main scanning unit 130 and a conveyance unit 140.

Figure 2:
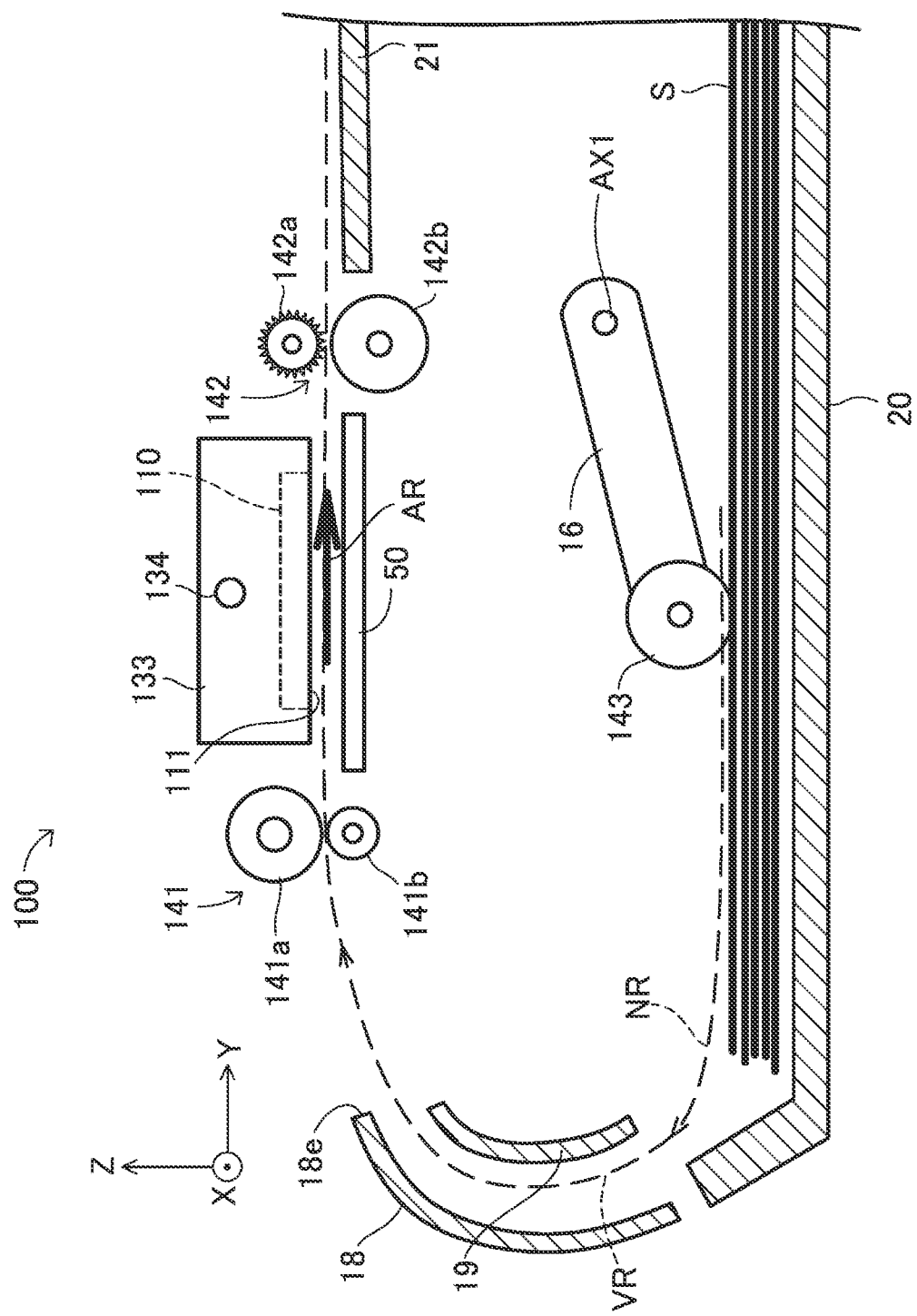
FIG. 2 depicts a schematic configuration of a printing mechanism 100.

FIG. 2 depicts a schematic configuration of the printing mechanism 100. The printing mechanism 100 further includes a sheet feeding tray 20 in which a plurality of sheets S before printing is accommodated with being overlapped, a sheet discharge tray 21 to which a printed sheet is to be discharged, and a platen 50 arranged to face a nozzle formation surface 111 of the printing head 110.

The conveyance unit 140 is configured to convey the sheet S along a conveyance path NR from the sheet feeding tray 20 to the sheet discharge tray 21 through a space between the printing head 110 and the platen 50. The conveyance path NR includes a curved path VR, which is a curved part, as seen in an X direction of FIG. 2. The curved path VR is arranged between a pickup roller 143 and a pair of upstream-side rollers 141 (which will be described later) on the conveyance path NR. The X direction is a direction perpendicular to a conveying direction AR and parallel with a printing surface of the sheet S to be conveyed. An upstream side of the conveyance path NR is simply referred to as 'upstream side', and a downstream side of the conveyance path NR is simply referred to as 'downstream side'.

The conveyance unit 140 includes an outer guide member 18 and an inner guide member 19 configured to guide the sheet S along the conveyance path NR, and a pickup roller 143, a pair of upstream-side rollers 141 and a pair of downstream-side rollers 142 provided on the conveyance path NR.

The outer guide member 18 and the inner guide member 19 are arranged on the curved path VR. The outer guide member 18 is a member configured to support the sheet S from an outer surface (printing surface) with the sheet S being curved on the curved path VR. The inner guide member 19 is a member configured to support the sheet S from an inner surface (a surface opposite to the printing surface) with the sheet S being curved on the curved path VR.

The pickup roller 143 is mounted to a leading end of an arm 16 configured to be rotatable about a shaft AX1, and is configured to hold the sheet S by sandwiching the sheet S between the pickup roller and the sheet feeding tray 20. In other words, the pickup roller 143 is provided at a more upstream side of the conveyance path NR than the pair of upstream-side rollers 141, and is configured to hold the sheet S. The pickup roller 143 is configured to separate one sheet S from the plurality of sheets S accommodated in the sheet feeding tray 20 and to deliver the same onto the conveyance path NR.

The pair of upstream-side rollers 141 includes a drive roller 141a configured to be driven by a motor (not shown) and a driven roller 141b configured to rotate in association with rotation of the drive roller 141a. Likewise, the pair of downstream-side rollers 142 includes a drive roller 142a and a driven roller 142b. The driven roller 142b of the pair of downstream-side rollers 142 is a roller having a plurality of thin plate-shaped spurs concentrically arranged. This is not to damage a print image printed on the sheet S. The drive roller 141a, the driven roller 141b and the drive roller 142a are cylindrical rollers, for example.

The pair of upstream-side rollers 141 is configured to hold the sheet S at a more upstream side than the printing head 110. The pair of downstream-side rollers 142 is configured to hold the sheet S at a more downstream side than the printing head 110. In the meantime, the conveying direction AR of FIG. 2 is a conveying direction (+Y direction) of the sheet between the printing head 110 and the platen 50.

The main scanning unit 130 includes a carriage 133 configured to mount thereto the printing head 110 and a slide shaft 134 configured to hold the carriage 133 to be reciprocally moveable in a main scanning direction (X-axis direction). The main scanning unit 130 is configured to reciprocally move the carriage 133 along the slide shaft 134 by using power of a main scanning motor (not shown). Thereby, a main scanning of reciprocally moving the printing head 110 in the main scanning direction is implemented.

Figure 3:
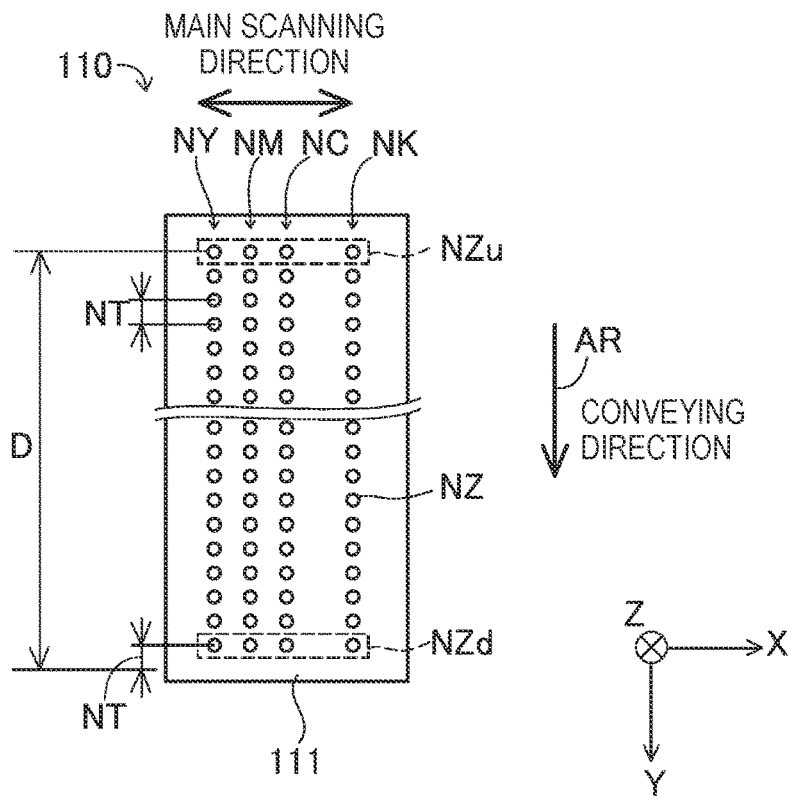
FIG. 3 depicts a configuration of a printing head 110, as seen from a −Z side (a lower side, in FIG. 2)

FIG. 3 depicts a configuration of the printing head 110, as seen from −Z side (a lower side, in FIG. 2). As shown in FIG. 3, the nozzle formation surface 111 of the printing head 110 facing the platen 50 is formed with a plurality of nozzle rows including a plurality of nozzles, i.e., nozzle rows NC, NM, NY, NK for discharging the respective inks of C, M, Y and K. Each nozzle row includes a plurality of nozzles NZ. The plurality of nozzles NZ has positions different from each other in the conveying direction AR, and is aligned with predetermined nozzle intervals NT in the conveying direction. The nozzle interval NT is a length in the conveying direction between two nozzles NZ, which are adjacent to each other in the conveying direction AR, of the plurality of nozzles NZ. A nozzle NZ, which is located at the most upstream side (−Y side), of the nozzles configuring the nozzle row, is referred to as the most upstream nozzle NZu. Also, a nozzle NZ, which is located at the most downstream side (+Y side), of the nozzles configuring the nozzle row, is referred to as the most downstream nozzle NZd. A length obtained by adding the nozzle interval NT to a length in the conveying direction AR from the most upstream nozzle NZu to the most downstream nozzle NZd is referred to as 'nozzle length D'.

The head drive unit 120 is configured to drive the printing head 110, which is configured to reciprocally move by the main scanning unit 130, on the sheet S to be conveyed by the conveyance unit 140. That is, the printing head 110 is configured to discharge the inks from the plurality of nozzles NZ of the printing head 110, thereby forming dots on the sheet S. Thereby, an image is printed on the sheet S.

A-2. Printing Processing

Figure 4:
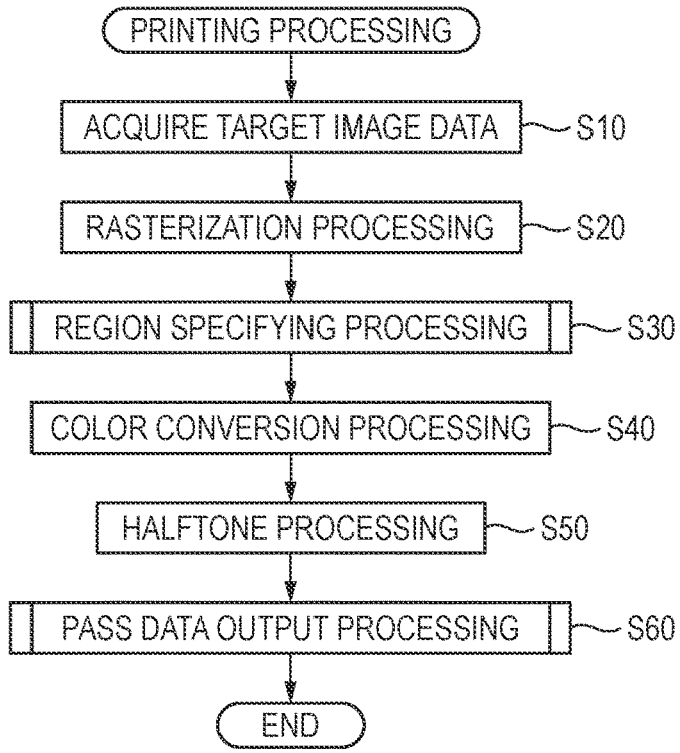
FIG. 4 is a flowchart of printing processing.

The CPU 210 (FIG. 1) of the printer 200 is configured to execute printing processing, based on a user's printing instruction. In the printing instruction, a designation of image data indicative of an image to be printed is included. FIG. 4 is a flowchart of the printing processing. In S10, the CPU 210 acquires image data designated by the printing instruction from the external device or the volatile storage device 230. The image data is image data having a variety of formats such as image data compressed in a JPEG manner or image data described by a description language, for example.

In S20, the CPU 210 executes rasterization processing for the acquired image data to generate RGB image data to express colors of respective pixels by RGB values. Thereby, RGB image data is acquired as target image data of the illustrative embodiment. The RGB values including three component values of red (R), green (G) and blue (B), for example.

In S30, the CPU 210 executes region specifying processing for the RGB image data (target image data). The region specifying processing is processing of specifying a character region and a non-character object region in an RGB image RI to be indicated by the RGB image data. The character region is a region indicative of a character, and the non-character object region is a region indicative of an object different from the character. The object different from the character means a part, which is different from a character, of parts (parts to be drawn by dots during the printing) having colors different from a background color (generally, white) corresponding to a ground color of the sheet S. The object different from the character includes a photograph, a drawing, and a background different from white.

Figure 5:
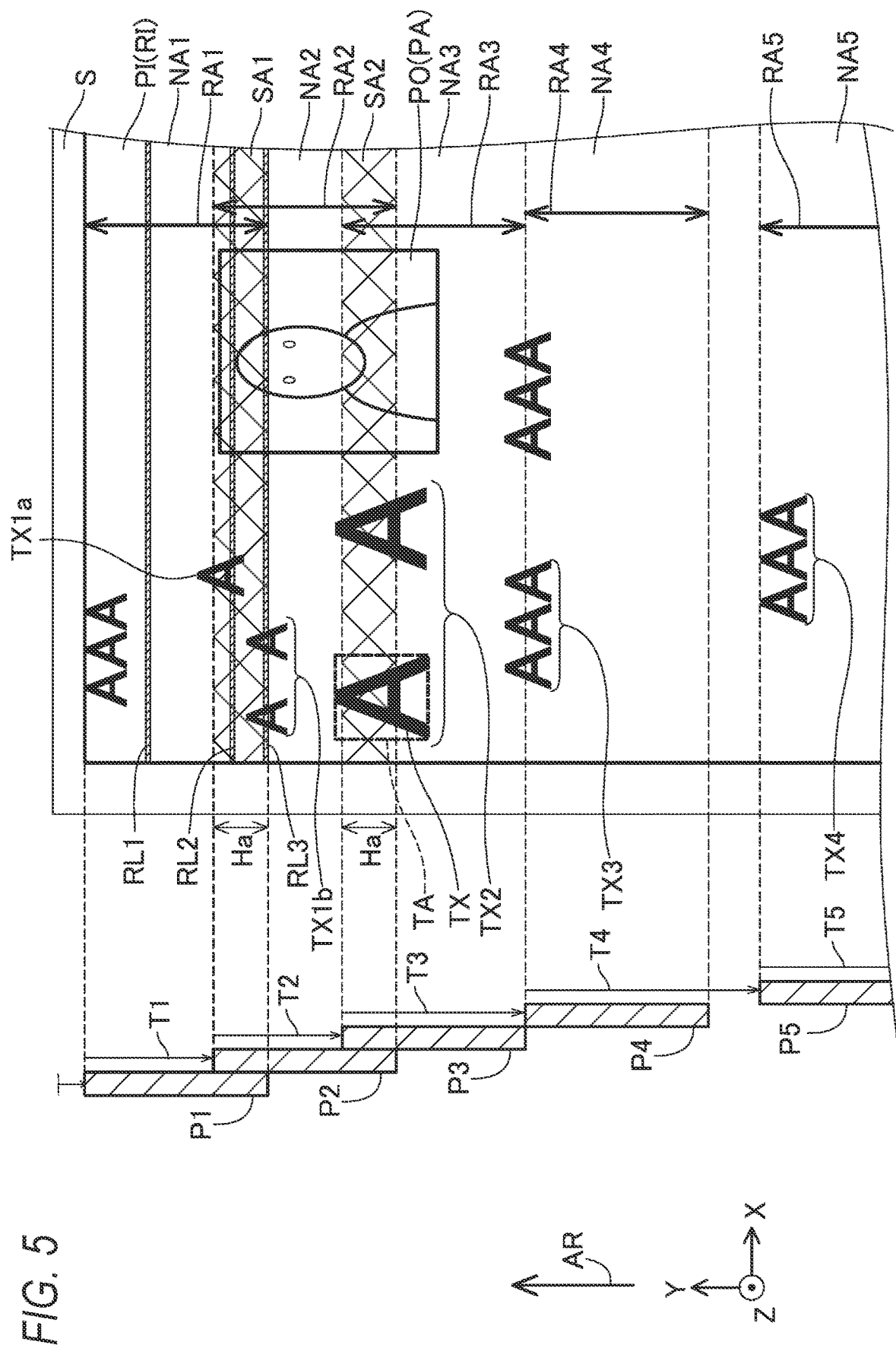
FIG. 5 depicts an example of a print image PI of a first illustrative embodiment.

FIG. 5 depicts an example of a print image PI of the first illustrative embodiment. Since the print image PI of FIG. 5 is an image printed on the basis of the RGB image data, it can be said that FIG. 5 is a figure indicative of the RGB image RI. As shown in FIG. 5, the RGB image RI includes a plurality of characters TX and a photograph PO. By the region specifying processing, a character region TA, which is a rectangular region circumscribing each of the characters TX, and a non-character object region PA, which is a rectangular region circumscribing the photograph PO, are specified. In the meantime, in FIG. 5, only the character region TA corresponding to one character is shown so as to avoid complication of the figure. However, in the processing, the character regions TA corresponding to all the characters TX in the RGB image RI are specified. In the meantime, a plurality of pixels configuring the RGB image RI and a plurality of pixels configuring the print image PI (which will be described later) correspond to each other. Therefore, the specifying of the character region TA and the non-character object region PA in the RGB image RI is equivalent to specifying a character region TA and a non-character object region PA in the print image PI. The region specifying processing will be described later.

In S40, the CPU 210 executes color conversion processing for the RGB image data to generate CMYK image data to express colors of respective pixels by CMYK values. The CMYK values are color values including component values (component values of C, M, Y, K) corresponding to color materials to be used for printing. The color conversion processing is executed by referring to a well-known look-up table, for example.

In S50, the CPU 210 executes halftone processing for the CMYK image data to generate dot data which expresses a dot formation state of each pixel for each color component of CMYK. Each pixel value of the dot data indicates the dot formation states of two gradations "there is no dot" and "there is a dot" or the dot formation states of four gradations "there is no dot", "small", "medium" and "large". The halftone processing is executed using a well-known method such as a dithering method, an error diffusion method or the like. The dot data is image data indicative of the print image PI (FIG. 5) including dots to be formed on a printing medium.

In S60, the CPU 410 executes pass data output processing by using the dot data. Specifically, the CPU 210 generates data (pass data), which corresponds to a single partial printing SP (which will be described later), of the dot data, adds a variety of control data to the pass data, and outputs the same to the printing mechanism 100. In the control data, data designating a conveyance amount of conveyance of the sheet S to be executed after the partial printing SP is included. As described in detail later, in the pass data output processing, the processing result of the region specifying processing in S30 is used.

Thereby, the CPU 210 can cause the printing mechanism 100 to print a print image. Specifically, the CPU 210 controls the head drive unit 120, the main scanning unit 130 and the conveyance unit 140 to alternately execute, a plurality of times, the partial printing SP and sheet conveyance T, repetitively, thereby performing the printing. In the single partial printing SP, while the single main scanning is performed with the sheet S being stationary on the platen 50, the inks are discharged from the nozzles NZ of the printing head 110 onto the sheet S, so that a part of an image to be printed is printed on the sheet S. The single sheet conveyance T is conveyance of moving the sheet S in the conveying direction AR by a predetermined conveyance amount. In the illustrative embodiment, the CPU 210 causes the printing mechanism 100 to execute m (m: an integer of 3 or larger) partial printings SPm.

FIG. 5 depicts the sheet S on which the print image PI is printed. Also, in FIG. 5, a head position P, i.e., a relative position of the printing head 110 to the sheet S in the conveying direction is shown for each partial printing SP (i.e., for each main scanning). For each of the plurality of partial printings SP, a pass number k (k: an integer of 1 or larger) is added in order of execution, and the kth partial printing SP is referred to as 'partial printing SPk'. The head position P upon execution of the partial printing SPk is referred to as 'head position Pk'. The sheet conveyance T that is to be executed between the kth partial printing SPk and the (k+1)th partial printing SP(k+1) is referred to as 'kth sheet conveyance Tk'. In FIG. 5, the head positions P1 to P5 and sheet conveyances T1 to T5 corresponding to the first to fifth partial printings SP1 to SP5 are shown.

Here, in FIG. 5, the print image PI formed on the sheet S includes a plurality of 1-pass regions NA1 to NA5 (regions not hatched in FIG. 5) and a plurality of overlap regions (also referred to as '2-pass region') SA1 and SA2 (regions hatched in FIG. 5).

Each of the 1-pass regions NA1 to NA5 is a region in which dots can be formed only with the single partial printing. Specifically, in the 1-pass region NAk, the dots can be formed only with the kth partial printing SPk, i.e., the partial printing SPk to be performed at the head position Pk.

The overlap regions SA1 and SA2 are regions in which the dots can be formed by the two partial printings. Specifically, in the overlap region SAk, the dots can be formed by the kth partial printing SPk and the (k+1)th partial printing SP(k+1). That is, in the overlap region SAk, the dots can be formed by the partial printing SPk to be performed at the head position Pk and the partial printing SP(k+1) to be performed at the head position P(k+1).

In the example of FIG. 5, the overlap region SA1 is arranged between the two 1-pass regions NA1 and NA2.

Likewise, the overlap region SA2 is arranged between the two 1-pass regions NA2 and NA3. Also, no overlap region is arranged between the two 1-pass regions NA3 and NA4 and between the two 1-pass regions NA4 and NA5. The region specifying processing (S30, in FIG. 4) and the pass data output processing (S60, in FIG. 4) for implementing such printing are described.

Figure 6:
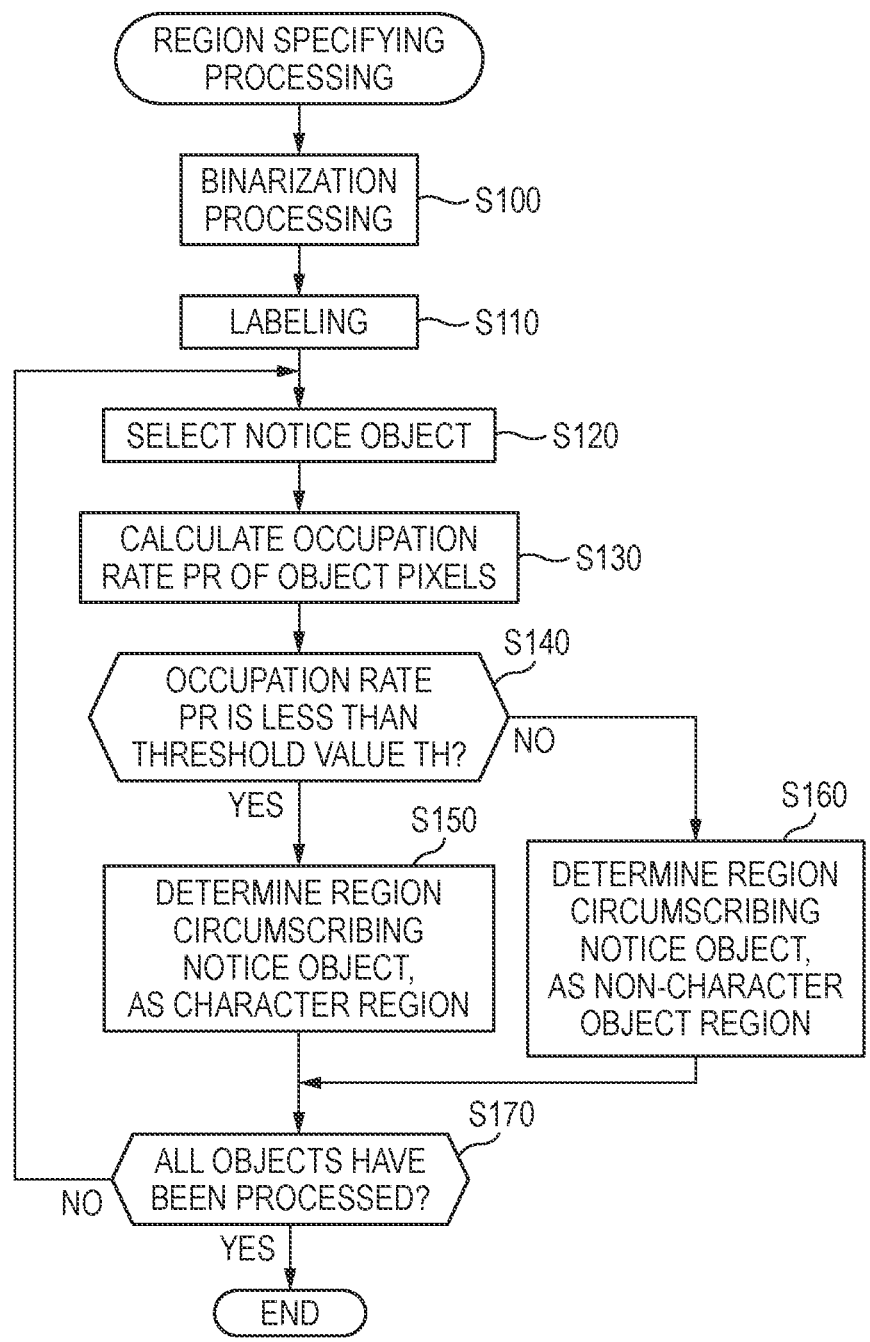
FIG. 6 is a flowchart of region specifying processing.

FIG. 6 is a flowchart of the region specifying processing. In S100, the CPU 210 executes binarization processing for the RGB image data to generate binary image data. Specifically, the plurality of pixels in the RGB image RI is classified into one of a background pixel having a background color (white, in the illustrative embodiment) and an object pixel having a color different from the background color. In the binary image data, a pixel value corresponding to the background pixel is "0" and a pixel value corresponding to the object pixel is "1", for example. Since the binary image data generated in S100 is data indicative of a specified object pixel, it is referred to as object specifying data, too.

In S110, the CPU 210 executes labeling processing for the object specifying data to specify a plurality of objects. Specifically, the CPU 210 allots one identifier to one region including one or more continuous object pixels, as one object. Then, the CPU 210 allots different identifiers to a plurality of objects spaced from each other. By the labeling processing, the plurality of objects is specified. In the example of FIG. 5, each of the characters TX and the photograph PO are specified as objects.

In S120, the CPU 210 selects one notice object from the plurality of specified objects.

In S130, the CPU 210 calculates an occupation rate PR of the object pixels for the notice object. The occupation rate PR is a ratio of the object pixels occupying a total number of pixels in a rectangle circumscribing the notice object. For example, when the character TX of FIG. 5 is the notice object, a total number of pixels SN of a circumscribed rectangle TA shown with the broken line and a number of object pixels PN configuring the character TX are calculated. Then, a value obtained by dividing the number of object pixels PN by the total number of pixels SN is calculated as the occupation rate PR (PR=PN/SN).

In S140, the CPU 210 determines whether the occupation rate PR is less than a threshold value TH1. The threshold value TH1 is empirically determined in advance by using an image including a character or a photograph. The threshold value TH1 is for example, 40% to 60%.

In the rectangle circumscribing the character, a thin line and a background (white background, in the illustrative embodiment) exist, and an occupation ratio of the thin line including the object pixels is lower, as compared to the non-character object such as a photograph. The non-character object, particularly, the photograph has the higher occupation rate PR, as compared to the character, for example. For example, since the photograph is generally rectangular and the substantially entirety thereof consists of the object pixels, the occupation rate PR may be 80% or higher. For this reason, when the occupation rate PR is less than the threshold value TH1 (S140: YES), the CPU 210 determines the region circumscribing the notice object, as the character region, in S150. When the occupation rate PR is equal to or higher than the threshold value TH1 (S140: NO), the CPU 210 determines the region circumscribing the notice object, as the non-character object region, in S160.

In S170, the CPU 210 determines whether all the specified objects have been processed as the notice object. When there is a not-processed object (S170: NO), the CPU 210 returns to S120 and selects the not-processed object. When all the objects have been processed (S170: YES), the CPU 210 ends the region specifying processing.

Figure 7:
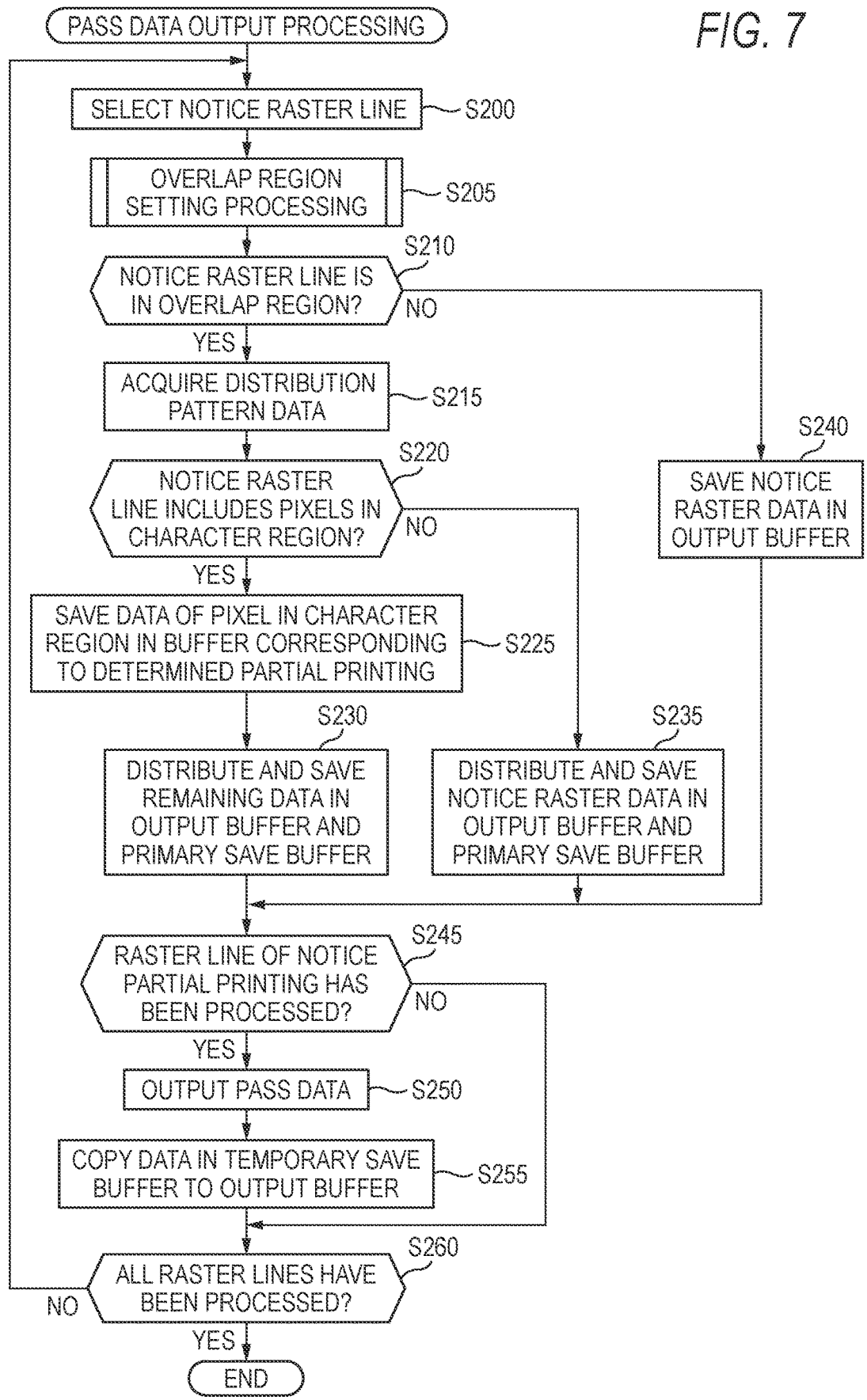
FIG. 7 is a flowchart of pass data output processing.

Subsequently, the pass data output processing in S60 of FIG. 4 is described. FIG. 7 is a flowchart of the pass data output processing. The print image PI (FIG. 5) indicated by the dot data generated in S50 includes a plurality of raster lines RL. The raster line RL is a line extending in a direction perpendicular to the conveying direction AR, like raster lines RL1 to RL3 of FIG. 5, for example, and is configured by a plurality of pixels. In S200, the CPU 210 selects one notice raster line from the plurality of raster lines RL. The notice raster line is sequentially selected one by one from the downstream side of the conveying direction AR toward the upstream side (i.e., from the upper side toward the lower side, in FIG. 5). Here, partial printing of printing the notice raster line is referred to as notice partial printing, too. However, when the notice raster line is printed by the two partial printings, i.e., when the notice raster line is located in the overlap region, the partial printing, which is to be first performed, of the two partial printings is set as the notice partial printing. For example, when the raster lines RL1 to RL3 are the notice raster lines, the notice partial printing is the partial printing SP1 to be performed at the head position P1.

In S205, the CPU 210 executes overlap region setting processing. The overlap region setting processing is processing of setting an overlap region in which the dots can be formed by the notice partial printing and the partial printing to be subsequently executed. For example, it is determined whether or not to set the overlap region. When the overlap region is to be set, a distribution destination of data of the character region in the overlap region is determined. For example, when the raster lines RL1 and RL2 of FIG. 5 are the notice raster lines, an overlap region SA1 having an overlap length Ha is determined to be set. In the meantime, the overlap region setting processing is executed for each of the raster lines. However, the same result is obtained for all the raster lines corresponding to the same notice partial printing.

In S210, the CPU 210 determines whether the notice raster line is located in the overlap region. Since the overlap length is determined in S205, the CPU 210 can determine whether the current notice raster line is located in the overlap region.

Figure 8A:
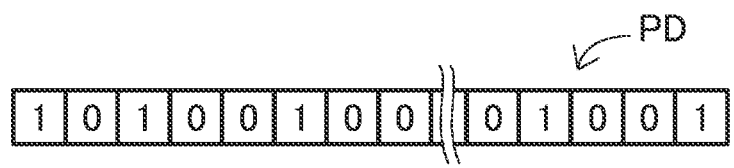
FIGS. 8A and 8B depicts distribution pattern data PD and recording rates of a partial printing at head positions P2 to P4.
Figure 8B:
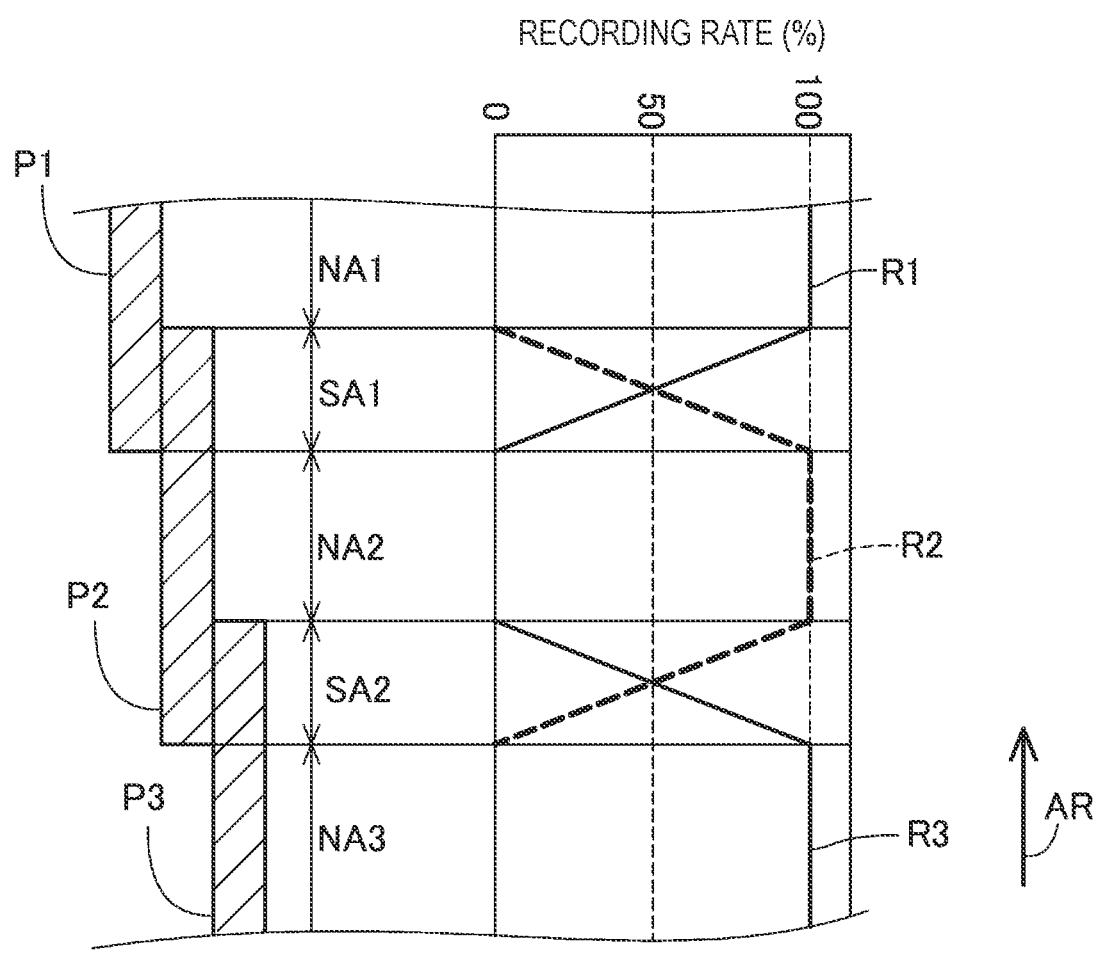

When the notice raster line is located in the overlap region (S210: YES), the CPU 210 acquires distribution pattern data PD corresponding to the notice raster line, in S215. FIGS. 8A and 8B depict the distribution pattern data PD and recording rates of the partial printing at the head positions P2 to P4. As shown in FIG. 8A, the distribution pattern data PD is binary data having values corresponding to respective pixels of the notice raster line. A value "0" of the distribution pattern data PD indicates that a dot corresponding to the pixel is to be formed by the notice partial printing. A value "1" of the distribution pattern data PD indicates that a dot corresponding to the pixel is to be formed by a subsequent partial printing of the notice partial printing. In this way, the distribution pattern data PD defines a distribution pattern of distributing a plurality of dots in the overlap region to one of a first dot that is to be formed by the notice partial printing and a second dot that is to be formed by the subsequent partial printing.

Here, the recording rates R1, R2 and R3 of FIG. 8B are recording rates of the partial printings SP1, SP2 and SP3 to be performed at the head positions P1, P2 and P3, respectively. In FIG. 8B, the respective recording rates R1, R2 and R3 are shown with respect to positions in the conveying direction AR. In a range in the conveying direction AR corresponding to the 1-pass region NA1 (FIG. 5), the recording rate R1 is 100%. Likewise, in ranges in the conveying direction AR corresponding to the 1-pass regions NA2 and NA3 (FIG. 5), the recording rates R2 and R3 are 100%. Although not shown, in ranges in the conveying direction AR corresponding to the 1-pass regions NA4 and NA5 (FIG. 5), the recording rates are 100%.

In a range in the conveying direction AR corresponding to the overlap region SA1 (FIG. 5), the recording rate R1 linearly decreases toward the upstream side (lower side, in FIG. 8B) of the conveying direction AR. In the range in the conveying direction AR corresponding to the overlap region SA1 (FIG. 5), the recording rate R2 linearly decreases toward the downstream side (upper side, in FIG. 8B) of the conveying direction AR. In the range in the conveying direction AR corresponding to the overlap region SA1 (FIG. 5), a sum of the recording rate R1 and the recording rate R2 is 100%. The recording rates R2 and R3 in a range in the conveying direction AR corresponding to the overlap region SA2 (FIG. 5) are also the same.

The distribution pattern data PD is generated so that the above-described recording rates are to be implemented in correspondence to the positions in the conveying direction AR in the overlap region.

As can be seen from the above description, when the overlap region SA2 is set, for example, the overlap region SA2 and the 1-pass region NA2 adjacent to the downstream side of the overlap region SA2 can be printed by the partial printing SP2 (FIG. 8B). Also, the overlap region SA2 and the 1-pass region NA3 adjacent to the upstream side of the overlap region SA2 can be printed by the partial printing SP3. As shown in FIG. 8B, as a position, in the conveying direction AR and in the overlap region SA2, of the dots being distributed comes closer to the 1-pass region NA2, a ratio of the dots being distributed to the first dot to be formed by the partial printing SP2 increases (refer to the recording rate R2). Also, as a position, in the conveying direction AR and in the overlap region SA2, of the dots being distributed comes closer to the 1-pass region NA3, a ratio of the dots being distributed to the second dot to be formed by the partial printing SP3 increases (refer to the recording rate R3). As a result, a boundary between an image to be printed in the overlap region SA2 and an image to be printed in the 1-pass region NA2 can be made to have a natural appearance. Also, a boundary between the image to be printed in the overlap region SA2 and an image to be printed in the 1-pass region NA3 can be made to have a natural appearance.

In S220, the CPU 210 determines whether the notice raster line includes the pixels in the character region. For example, when the notice raster line is the raster lines RL2 and RL3 of FIG. 5, the notice raster line is determined to include the pixels in the character region. When the notice raster line is the raster line RL1 of FIG. 5, the notice raster line is determined not to include the pixels in the character region.

When the notice raster line includes the pixels in the character region (S220: YES), the CPU 210 saves, in a buffer corresponding to a determined partial printing, data of the pixels in the character region of data (referred to as notice raster data, too) corresponding to the notice raster line, in S225. The determined partial printing is partial printing, which is determined for each character region in the overlap region setting processing (which will be described later) of S205 from the notice partial printing and the subsequent partial printing of the notice partial printing. In the volatile storage device 230, two types of buffers, i.e., an output buffer and a primary save buffer are secured. The output buffer is a buffer corresponding to the notice partial printing, and the primary save buffer is a buffer corresponding to the subsequent partial printing. In this way, the data of pixels in one character region is output to one buffer. For this reason, the plurality of dots corresponding to the plurality of pixels in one character region is formed only by one of the notice partial printing and the subsequent partial printing and is not formed by the other.

In S230, the CPU 210 distributes and saves remaining data of the notice raster data, i.e., data of pixels except the character region of the notice raster data in the output buffer and the primary save buffer, in accordance with the distribution pattern data PD. That is, data, which indicates the first dots to be formed by the notice partial printing, of the remaining data is saved in the output buffer, and data, which indicates the second dots to be formed by the subsequent partial printing of the notice partial printing, is saved in the primary save buffer. For this reason, some of the plurality of dots corresponding to the plurality of pixels other than the character region are formed by the notice partial printing, and other of the plurality of dots are formed by the subsequent partial printing.

When the notice raster line does not include the pixels in the character region (S220: NO), the CPU 210 distributes and saves the notice raster data in the output buffer and the primary save buffer, in accordance with the distribution pattern data PD, in S235. That is, data, which indicates the first dots to be formed by the notice partial printing, of the notice raster data is saved in the output buffer, and data, which indicates the second dots to be formed by the subsequent partial printing of the notice partial printing, is saved in the primary save buffer.

When the notice raster line is not located in the overlap region (S210: NO), the dots corresponding to the plurality of pixels included in the notice raster line should be all formed by the notice partial printing. Therefore, in this case, the CPU 210 saves the notice raster data of the dot data in the output buffer, in S240.

In S245, the CPU 210 determines whether the raster lines of the notice partial printing have been all processed as the notice raster line. For example, in the case where the partial printing SP1 performed at the head position P1 of FIG. 5 is the notice partial printing, when the raster line RL3, which is located at the most upstream side with respect to the conveying direction AR, of the plurality of raster lines RL corresponding to the head position P1 is the notice raster line, it is determined that the raster lines of the notice partial printing have been all processed.

When the raster lines of the notice partial printing have been all processed (S245: YES), the dot data of the notice partial printing has been saved in the output buffer at that point in time. Therefore, in this case, in S250, the CPU 210 outputs the dot data of the notice partial printing to the printing mechanism 100, as the pass data. At this time, the pass data to be output is added with control data indicative of a conveyance amount of the sheet conveyance that is to be performed after the notice partial printing. The conveyance amount of the sheet conveyance that is to be performed after the notice partial printing is a value that is to be determined in correspondence to the overlap length to be determined in the overlap region setting processing (which will be described later) of S205. For example, when the overlap length is determined to be Ha, the CPU 210 calculates a value obtained by subtracting the overlap length Ha from the nozzle length D, as a conveyance amount TV of the sheet conveyance T, adds control data indicative of the conveyance amount TV to the pass data, and outputs the same.

In S255, the CPU 210 deletes the output pass data from the output buffer, and copies the data saved in the primary save buffer to the output buffer. For example, at a point in time at which the final raster line RL3 corresponding to the head position P1 of FIG. 5 has been processed, the raster lines in the overlap region SA1 of the plurality of raster lines corresponding to the head position P2 have been already processed. The data, which is used in the partial printing SP2 to be performed at the head position P2, of the raster data corresponding to the processed raster lines has been already saved in the primary save buffer. In this step, the data is copied to the output buffer.

When there is a not-processed raster line of the notice partial printing (S245: NO), the CPU 210 skips over S250 and S255.

In S260, the CPU 210 determines whether all the raster lines in the print image PI have been processed as the notice raster line. When there is a not-processed raster line (S260: NO), the CPU 210 returns to S200, and selects the not-processed raster line as the notice raster line. When all the raster lines have been processed (S260: YES), the CPU 210 ends the pass data output processing.

Figure 9A:
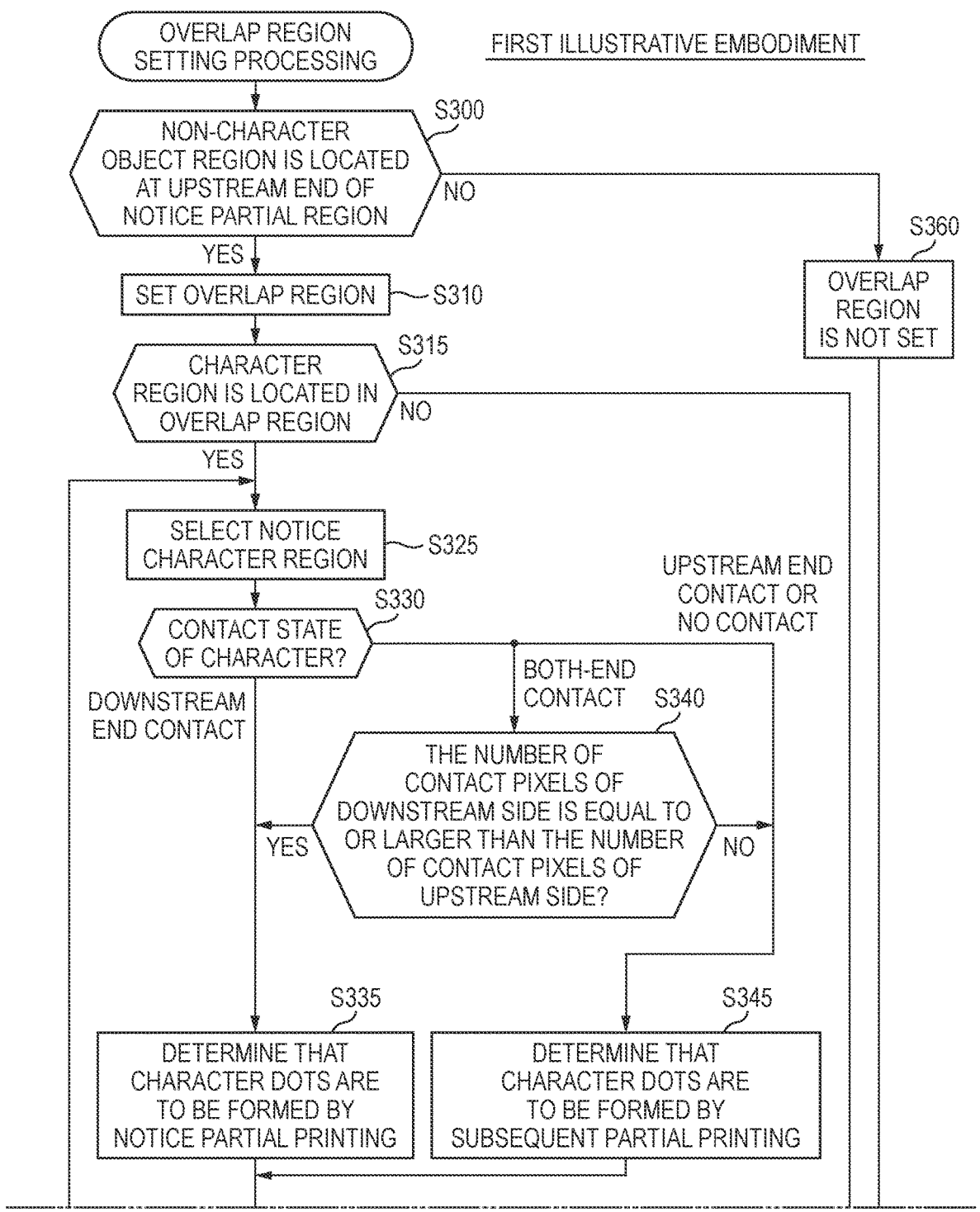
FIGS. 9A and 9B are a flowchart of overlap region setting processing.
Figure 9B:
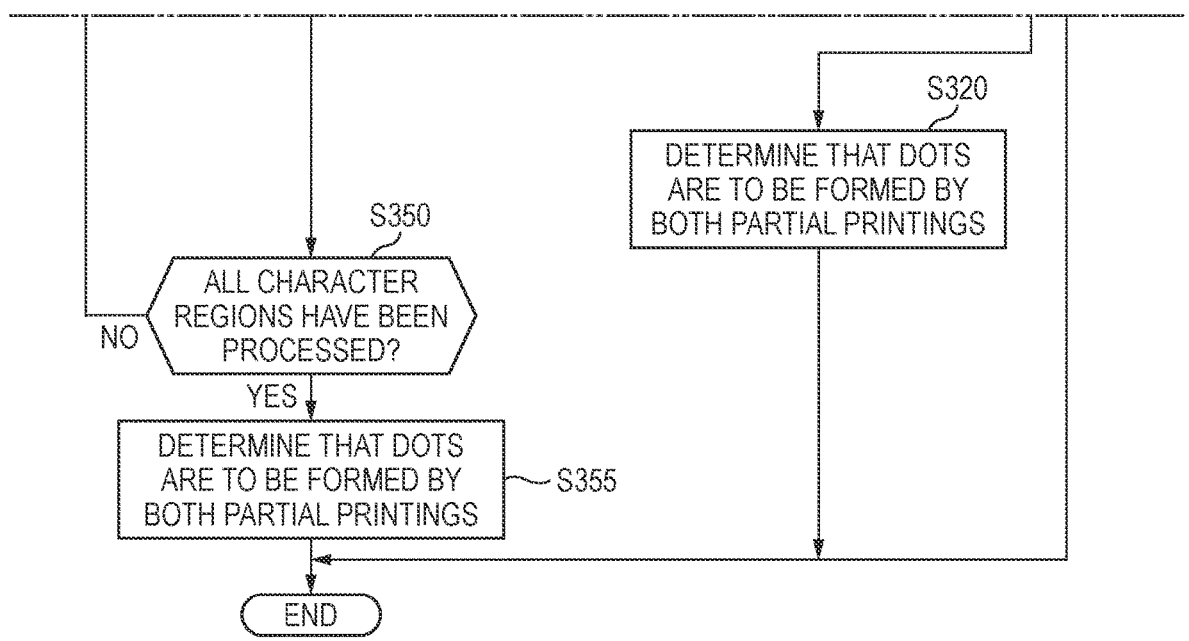
Figure 10:
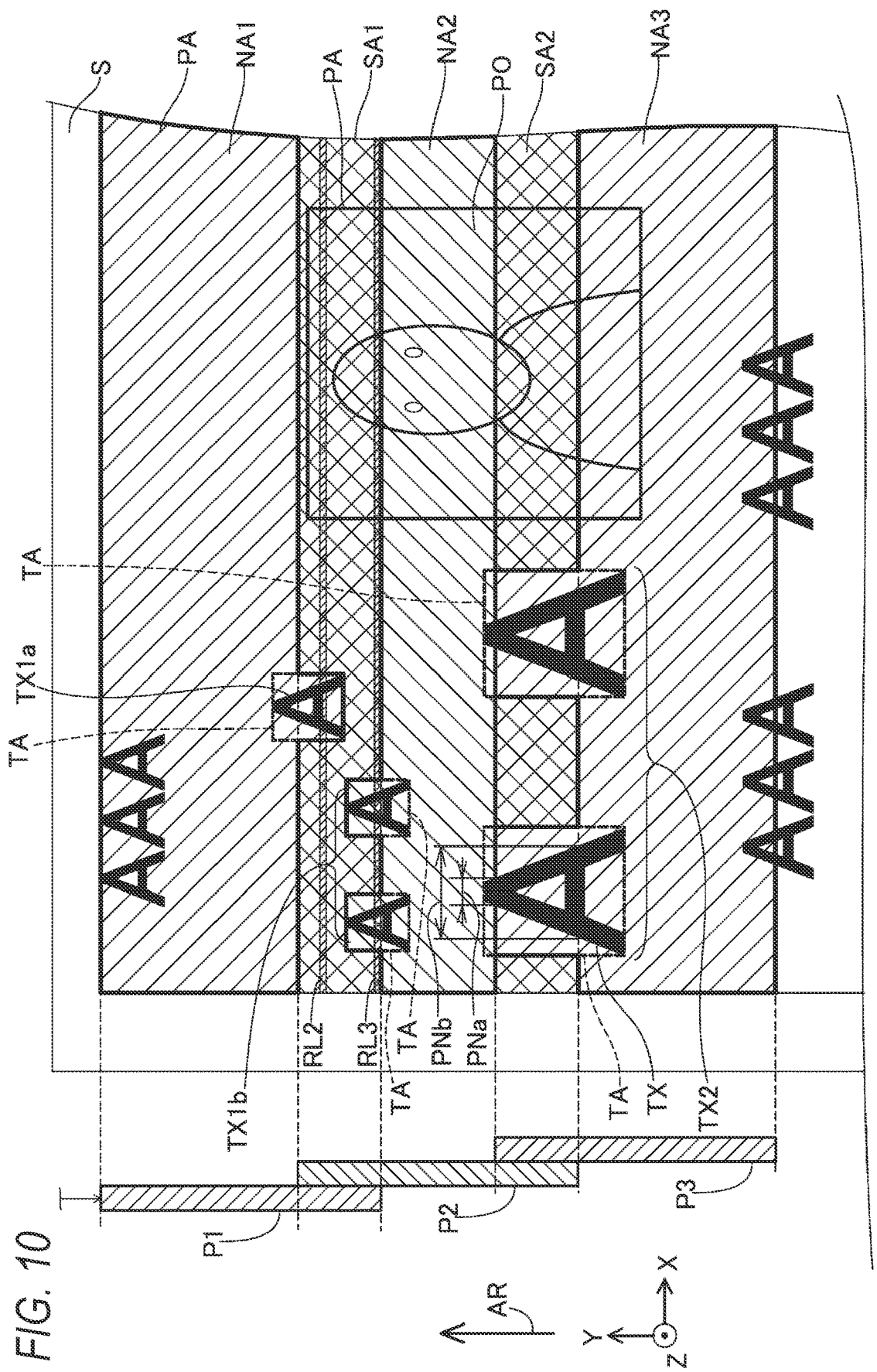
FIG. 10 is an enlarged view of the print image PI.

The overlap region setting processing in S205 of FIG. 7 is described. FIGS. 9A and 9B are a flowchart of the overlap region setting processing. FIG. 10 is an enlarged view of the print image PI. Here, a region that can be printed by the notice partial printing is referred to as 'notice partial region'. For example, when the notice partial printing is the partial printing SP1 that is performed at the head position P1, the notice partial region is a partial region RA1 of FIG. 5. When the notice partial printing is the partial printing SP2 that is performed at the head position P2, the notice partial region is a partial region RA2 of FIG. 5.

In S300, the CPU 210 determines whether the non-character object region PA is located at an upstream end (i.e., an opposite end in the conveying direction AR, a lower end in FIG. 5) of the notice partial region in the conveying direction AR. The non-character object region PA has been specified in the region specifying processing (FIG. 6). In the example of FIG. 5, the non-character object region PA is located at the upstream ends of the partial regions RA1 and RA2 that can be printed by the partial printings SP1 and SP2. The non-character object region PA is not located at the upstream ends of the partial region RA3 to RA5 that can be printed by the partial printings SP3 to SP5. Therefore, when the notice partial printing is the partial printing SP1; SP2, it is determined that the non-character object region PA is located at the upstream end of the notice partial printing, and when the notice partial printing is the partial printing SP3 to SP5, it is determined that the non-character object region PA is not located at the upstream end of the notice partial printing.

When the non-character object region PA is located at the upstream end of the notice partial region (S300: YES), the CPU 210 sets an overlap region in which dots can be formed by both the notice partial printing and the subsequent partial printing of the notice partial printing, in S310. The overlap region is a region including the upstream end of the notice partial region. In the illustrative embodiment, a length (overlap length) of the overlap region in the conveying direction AR is Ha. For example, the conveyance amount TV of the sheet conveyance T that is to be performed after the notice partial printing is set as a value obtained by subtracting the length Ha from the nozzle length D (TV=D−Ha). As a result, for example, the conveyance amounts of the sheet conveyances T1 and T2 of FIG. 5 are respectively set as (D−Ha), and the overlap regions SA1 and SA2 having the overlap length Ha are set.

In S315, the CPU 210 determines whether the character region TA is located in the overlap region (hereinafter, referred to as 'notice overlap region', too) set at the upstream side of the notice partial region. In the example of FIG. 5, when the notice partial region is the partial region RA1, the character region TA including a character TX1$a$ and the character region TA including characters TX1$b$ are located in the notice overlap region (overlap region SA1). When the notice partial region is the partial region RA2, the character region TA including a character TX2 is located in the notice overlap region (overlap region SA2). Therefore, when the notice partial region is the partial region RA1; RA2, it is determined that the character region TA is located in the notice overlap region.

When the character region TA is not located in the notice overlap region (S315: NO), the CPU 210 determines that dots to be formed in the notice overlap region are to be formed in a distributed manner by both the partial printings, i.e., both the notice partial printing and the subsequent partial printing of the notice partial printing, in S320, and ends the overlap region setting processing.

When the character region TA is located in the notice overlap region (S315: YES), the CPU 210 determines one notice character region from one or more character regions TA located in the notice overlap region, in S325.

In S330, the CPU 210 determines a contact state of the character in the notice character region. The contact state of the character is one of a downstream end contact state, an upstream end contact state, a both-end contact state, and a non-contact state. The downstream end contact state is a state where the character in the notice character region is in contact with only the downstream end (upper end in FIG. 10) of the notice overlap region. The upstream end contact state is a state where the character in the notice character region is in contact with only the upstream end (lower end in FIG. 10) of the notice overlap region. Both-end contact state is a state where the character in the notice character region is in contact with both the upstream end and the downstream end of the notice overlap region. The non-contact state is a state where the character in the notice character region is not in contact with neither the upstream end nor the downstream end of the notice overlap region.

In the downstream end contact state, the notice character region is arranged over the notice overlap region and a region adjacent to the downstream side of the notice overlap region. In the upstream end contact state, the notice character region is arranged over the notice overlap region and a region adjacent to the upstream side of the notice overlap region. In both-end contact state, the notice character region is arranged over the notice overlap region, a region adjacent to the downstream side of the notice overlap region and a region adjacent to the upstream side of the notice overlap region. In the non-contact state, the notice character region is arranged only in the notice overlap region.

In the example of FIG. 10, when the notice overlap region is the overlap region SA1, the character TX1$a$ is determined to be in the downstream end contact state and the character TX1$b$ is determined to be in the upstream end contact state. When the notice overlap region is the overlap region SA2, the character TX2 is determined to be in both-end contact state.

When the contact state of the character in the notice character region is the downstream end contact state, the CPU 210 determines that dots (character dots) to be formed in the notice character region are to be formed by the notice partial printing, in S335. When the contact state of the character in the notice character region is the upstream end contact state, the CPU 210 determines that character dots to be formed in the notice character region are to be formed by the subsequent partial printing of the notice partial printing, in S345. In the example of FIG. 10, the dots configuring the character TX1a are determined to be formed by the notice partial printing, specifically, the partial printing SP1 to be performed at the head position P1. The dots configuring the character TX1b are determined to be formed by the subsequent partial printing, specifically, the partial printing SP2 to be performed at the head position P2.

When the contact state of the character in the notice character region is the non-contact state, the character dots to be formed in the notice character region are preferably formed only by one of the notice partial printing and the subsequent partial printing. In the illustrative embodiment, in this case, in S345, the CPU 210 determines that the character dots to be formed in the notice character region are to be formed by the subsequent partial printing of the notice partial printing. In a modified embodiment, in this case, in S335, the CPU 210 may determine that the character dots to be formed in the notice character region are to be formed by the notice partial printing.

When the contact state of the character in the notice character region is both-end contact state, the CPU 210 determines whether a number of contact pixels PNa at the downstream side is equal to or larger than a number of contact pixels PNb at the upstream side, in S340. The number of contact pixels PNa at the downstream side is the number of pixels, which are in contact with the 1-pass region adjacent to the downstream side of the notice overlap region, of the object pixels (i.e., character pixels) in the notice character region. The number of contact pixels PNb at the upstream side is the number of pixels, which are in contact with the 1-pass region adjacent to the upstream side of the notice overlap region, of the object pixels (i.e., character pixels) in the notice character region. For example, in the character TX2 of FIG. 10, the number of contact pixels PNa at the downstream side is the number of pixels, which are in contact with the 1-pass region NA2, of the object pixels in the character region TA including the character TX2. Also, the number of contact pixels PNb at the upstream side is the number of pixels, which are in contact with the 1-pass region NA3, of the object pixels in the character region TA including the character TX2. In the example of FIG. 10, it is determined that the number of contact pixels PNa at the downstream side is smaller than the number of contact pixels PNb at the upstream side.

When the number of contact pixels PNa at the downstream side is equal to or larger than the number of contact pixels PNb at the upstream side (S340: YES), the CPU 210 determines that the character dots to be formed in the notice character region are to be formed by the notice partial printing, in S335. When the number of contact pixels PNa at the downstream side is smaller than the number of contact pixels PNb at the upstream side (S340: NO), the CPU 210 determines that the character dots to be formed in the notice character region are to be formed by the subsequent partial printing of the notice partial printing, in S345. In the example of FIG. 10, the dots configuring the character TX2 are determined to be formed by the subsequent partial printing, specifically, the partial printing SP3 to be performed at the head position P3.

In S350, the CPU 210 determines whether all the character regions located in the notice overlap region have been processed as the notice character region. When there is a not-processed character region (S350: NO), the CPU 210 returns S325 and selects the not-processed character region. When all the character regions have been processed (S350: YES), the CPU 210 proceeds to S355.

In S355, the CPU 210 determines that the non-character dots other than the character region of the dots to be formed in the notice overlap region are to be formed in a distributed manner by both the partial printings, i.e., the notice partial printing and the subsequent partial printing of the notice partial printing, and ends the overlap region setting processing.

When the non-character object region PA is not located at the upstream end of the notice partial region (S300: NO), the CPU 210 does not set the overlap region in S360, and ends the overlap region setting processing. In this case, there are a first case where only the character region TA is located at the upstream end of the notice partial region and a second case where both the non-character object region PA and the character region TA are located at the upstream end of the notice partial region.

In the first case, the conveyance amount TV of the sheet conveyance T to be performed after the notice partial printing is determined to be a nozzle length D (TV=D). For example, the conveyance amount of the sheet conveyance T3 in FIG. 5 is set to the nozzle length D, the downstream end of the head position P4 of the subsequent partial printing SP4 coincides with the upstream end of the head position P4 of the previous partial printing SP3.

In the second case, the conveyance amount TV of the sheet conveyance T to be performed after the notice partial printing is set to a value greater than the nozzle length D so that the downstream end (upper end in FIG. 5) of the head position of the subsequent partial printing in the conveying direction AR is to be located at a downstream end of an object to be subsequently printed (TV>D). For example, the conveyance amount of the sheet conveyance T4 in FIG. 5 is set to a value greater than the nozzle length D, and the downstream end of the head position P5 of the subsequent partial printing SP5 is located at a downstream end of the character TX4 to be subsequently printed.

The print image PI that is printed as a result of the execution of the printing processing shown in FIG. 4 is further described with reference to FIG. 10. In FIG. 10, a single-hatched image is a 1-pass partial image printed (i.e., dotted) only by the single partial printing. In FIG. 10, a cross-hatched image is a 2-pass partial image printed by the two partial printings. The 1-pass regions NA1, NA2 and NA3 are regions in which the dots can be formed only by the single partial printing. For this reason, as shown in FIG. 10, an image in each of the 1-pass regions NA1, NA2 and NA3 is a 1-pass partial image entirely printed by the single partial printing. The overlap regions SA1 and SA2 are regions in which the dots can be formed by the two partial printings. For this reason, as shown in FIG. 10, an image in the character region TA of images in the overlap regions SA1 and SA2 is a 1-pass partial image printed by the single partial printing, and an image outside the character region TA is a 2-pass partial image printed by the two partial printings.

Here, it is assumed that an overlap region is not set and the print image is configured only by the 1-pass partial images printed in the 1-pass regions. In this case, due to a deviation of the conveyance amount of the sheet S, a white stripe or a black stripe may occur at a boundary of the two 1-pass partial images adjacent to each other in the conveying direction AR. That is, a defect referred to as banding may be caused. The banding is difficult to be noticeable even when it appears on the thin line configuring the character, and is easily-noticeable when it appears in a relatively wide region such as a photograph. Like this, the banding is more difficult to be noticeable in the character than in the non-character object such as a photograph.

Here, when an overlap region is provided between the two 1-pass regions and a 2-pass partial image is printed in the overlap region, it is possible to suppress the defect referred to as banding. That is, in the case of the 2-pass partial image, since the dots on one raster line are formed by the two partial printings, it is possible to suppress all the dots on one raster line from deviating in the same manner with respect to all the dots on the other raster lines. Meanwhile, in the case of the 2-pass partial image, the thin line is likely to be thickened. The reason is that the dots formed by one partial printing of the 2-pass partial image may deviate with respect to the dots formed by the other partial printing in the main scanning direction or the conveying direction. For this reason, in the case of the 2-pass partial image, a defect that a character configured by the thin line is thickened is likely to occur. In the meantime, in the case of the non-character object such as a photograph, the defect is difficult to occur even though it is the 2-pass partial image.

In the illustrative embodiment, as shown in FIG. 10, when the character regions TA and the non-character object region PA are included in the overlap region SA1, the CPU 210 forms a plurality of character dots, which are dots in each character region TA included in the overlap region SA1, only by one of the partial printing SP1 and the partial printing SP2. In the example of FIG. 10, the character dots in the character region TA, which includes the character TX1b, in the overlap region SA1 are formed only by the partial printing SP2. The character dots in the character region TA, which includes the character TX1a, in the overlap region SA1 are formed only by the partial printing SP1. The CPU 210 further forms non-character dots, which are dots in the non-character object region PA included in the overlap region SA1, by both the partial printing SP1 and the partial printing SP2. That is, some of the non-character dots, which are dots in the non-character object region PA included in the overlap region SA1, are formed by the partial printing SP1, and the other dots are formed by the partial printing SP2.

Likewise, when the character regions TA and the non-character object region PA are included in the overlap region SA2, the CPU 210 forms a plurality of character dots, which are dots in each character region TA included in the overlap region SA2, only by one of the partial printing SP2 and the partial printing SP3. In the example of FIG. 10, the character dots in the character region TA, which includes the character TX2, in the overlap region SA2 are formed only by the partial printing SP3. The CPU 210 further forms non-character dots, which are dots in the non-character object region PA included in the overlap region SA2, by both the partial printing SP2 and the partial printing SP3. That is, some of the non-character dots, which are dots in the non-character object region PA included in the overlap region SA2, are formed by the partial printing SP2, and the other dots are formed by the partial printing SP3.

As a result, in the overlap regions SA1 and SA2, since the image in the character region TA is the 1-pass partial image, it is possible to suppress the character from being thickened. Also, since the image in the non-character object region PA in the overlap regions SA1 and SA2 is the 2-pass partial image, it is possible to suppress the banding from being caused.

Also, in the illustrative embodiment, as can be seen from FIG. 10, the CPU 210 forms the two or more character dots in the character region TA corresponding to the plurality of pixels in the raster line RL2 (FIG. 10) only by the partial printing SP1. The CPU 210 forms some of the two or more non-character dots in the non-character object region PA corresponding to the plurality of pixels in the raster line RL2 by the partial printing SP1, and forms the other dots of the two or more non-character dots by the partial printing SP2. Likewise, the CPU 210 forms the two or more character dots in the character region TA corresponding to the plurality of pixels in the raster line RL3 (FIG. 10) only by the partial printing SP2. The CPU 210 forms some of the two or more non-character dots in the non-character object region PA corresponding to the plurality of pixels in the raster line RL3 by the partial printing SP2, and forms the other dots of the two or more non-character dots by the partial printing SP3.

As a result, even when the character region TA and the non-character object region PA are aligned side by side in the main scanning direction perpendicular to the conveying direction AR, it is possible to suppress the character in the character region TA from being thickened while suppressing the banding in the non-character object region PA.

As shown in FIG. 10, the character region TA including the character TX1a is arranged in the overlap region SA1 and the 1-pass region NA1 adjacent to the downstream side of the overlap region SA1 and is not arranged in the 1-pass region NA2 adjacent to the upstream side of the overlap region SA1. In this case, according to the illustrative embodiment, the CPU 210 forms the plurality of character dots in the character region TA including the character TX1a by the partial printing SP1 of printing an image in the 1-pass region NA1. Therefore, the character TX1a is entirely printed only by the partial printing SP1. If a part of the downstream side of the character TX1a located in the 1-pass region NA is printed by the partial printing SP1 and a part of the upstream side located in the overlap region SA1 is printed by the partial printing SP2, the part of the upstream side deviates with respect to the part of the downstream side, so that an edge appearance of the character TX1a may be deteriorated. In the illustrative embodiment, such defect is suppressed, so that the edge appearance of the character TX1a can be improved.

Also, the character region TA including the characters TX1b is arranged in the overlap region SA1 and the 1-pass region NA2 adjacent to the upstream side of the overlap region SA1 and is not arranged in the 1-pass region NA2 adjacent to the downstream side of the overlap region SA1. In this case, according to the illustrative embodiment, the CPU 210 forms the plurality of character dots in the character region TA including the character TX1b by the partial printing SP2 of printing an image in the 1-pass region NA2. Therefore, the character TX1b is entirely printed only by the partial printing SP2. As a result, the edge appearance of the character TX1b can be improved.

As shown in FIG. 10, the character region TA including the characters TX2 is arranged in the overlap region SA2, the 1-pass region NA2 adjacent to the downstream side of the overlap region SA2 and the 1-pass region NA3 adjacent to the upstream side of the overlap region SA2. In this case, according to the illustrative embodiment, when the number of contact pixels PNa of the downstream side of the character in the character region TA is smaller than the number of contact pixels PNb of the upstream side, like the example of FIG. 10, the CPU 210 forms the plurality of character dots in the character region TA including the characters TX2 by the partial printing SP3 of printing an image in the 1-pass region NA3 adjacent to the upstream side. On the other hand, although not shown, the number of contact pixels PNa of the downstream side of the character in the character region TA is equal to or larger than the number of contact pixels PNb of the upstream side, unlike the example of FIG. 10, the CPU 210 forms the plurality of character dots in the character region TA including the characters TX2 by the partial printing SP2 of printing an image in the 1-pass region NA2 adjacent to the downstream side. It is thought that the larger the number of contact pixels is, the part of the upstream side more deviates with respect to the part of the downstream side and the appearance is deteriorated. According to the illustrative embodiment, since the characters TX2 can be printed by the appropriate partial printing of the two partial printings SP2 and SP3, the edge appearance of the character TX2 can be appropriately improved.

Also, according to the overlap region setting processing, when the non-character object region PA is located at the upstream end of the notice partial region (for example, the partial region RA1) (YES in S300 of FIG. 9A), the CPU 210 sets the conveyance amount of the sheet conveyance T, which is executed between the notice-part printing (for example, the partial printing SP1) and the subsequent partial printing (for example, the partial printing SP2), to the first conveyance amount ((D−Ha), in the illustrative embodiment). Then, the CPU 210 sets a region, which includes the upstream end, of the notice partial region, as the overlap region (for example, the overlap region SA1) (S310 in FIG. 9A). Therefore, in the example of FIG. 5, the printing mechanism 100 executes the partial printing SP1, conveys the sheet S by the conveyance amount (D−Ha) after the partial printing SP1, and executes the partial printing SP2 after the conveyance of the sheet S by the conveyance amount (D−Ha), under control of the CPU 210. As a result, when the non-character object region PA is located at the upstream end of the partial region RA1 of FIG. 5, a region including the upstream end of the partial region RA1 is set as the overlap region SA1, so that it is possible to suppress the banding from being noticeable in the print image PI.

Also, when the non-character object region PA is not located at the upstream end of the notice partial region (for example, the partial region RA3) (NO in S300 of FIG. 9A), the CPU 210 sets the conveyance amount of the sheet conveyance T, which is executed between the notice-part printing (for example, the partial printing SP3) and the subsequent partial printing (for example, the partial printing SP4), to a second conveyance amount (D, in the illustrative embodiment) greater than the first conveyance amount. In this case, the CPU 210 does not set the overlap region (S360 in FIG. 9A). Therefore, in the example of FIG. 5, the printing mechanism 100 executes the partial printing SP3, conveys the sheet S by the conveyance amount D after the partial printing SP3, and executes the partial printing SP4 after the conveyance of the sheet S by the conveyance amount D, under control of the CPU 210.

As a result, when the non-character object region PA is not located at the upstream end of the partial region RA3 and the character region TA including a character TX3 is located, a region including the upstream end of the partial region RA3 is not set as the overlap region. That is, the dots of the region including the upstream end of the partial region RA3 (FIG. 5) are formed only by the partial printing SP3 and are not formed by the partial printing SP4. Therefore, it is possible to suppress the character TX3 from being thickened. Also, in this case, after the partial printing SP3, the sheet S is conveyed by the conveyance amount D greater than the conveyance amount (D−Ha), so that it is possible to increase the printing speed.

Also, according to the illustrative embodiment, in the region specifying processing (FIG. 6), when the ratio (occupation rate PR) of the object pixels occupying the region (the region of the circumscribed rectangle of the notice object) of the determination target of the RGB image RI is less than the threshold value TH (YES in S140 of FIG. 6), the CPU 210 specifies the region of the determination target, as the character region (S150 in FIG. 6). As a result, it is possible to appropriately specify the character region TA in the RGB image RI, and further, in the print image PI.

As can be seen from the above descriptions, the conveyance amount (D−Ha) of the illustrative embodiment is an example of the first movement amount, and the conveyance amount D is an example of the second movement amount. Also, the number of contact pixels PNa of the downstream side of the illustrative embodiment is an example of the number of first pixels, the number of contact pixels PNb of the upstream side is an example of the number of second pixels.

B. Modified Embodiments (1) The overlap region setting processing (FIGS. 9A and 9B) of the illustrative embodiment is exemplary and can be appropriately changed. For example, simpler overlap region setting processing can be executed. For example, the processing of S300 and S360 in FIG. 9A may be omitted, and the region including the upstream end of the notice partial region may be always set as the overlap region. Also, the processing of S325, S330, S340 and S345 may be omitted, and the character dots of the character region TA in the notice overlap region may be determined to be always formed by the notice partial printing.

(2) In the illustrative embodiment, the character dots of the dots corresponding to the plurality of pixels of one raster line RL2; RL3 are formed only by the partial printing SP1 or the partial printing SP2, and the non-character dots are formed by both the partial printing SP1 and the partial printing SP2. Instead of this configuration, for example, the CPU 210 may be configured to determine whether a region, in which the notice raster line is located, is the character region or the non-character region, for each of the notice raster lines in the overlap region. When it is determined that the region, in which the notice raster line is located, is the character region, the CPU 210 may form all the dots corresponding to the notice raster line only by the partial printing SP1 or the partial printing SP2, as the character dots. When it is determined that the region, in which the notice raster line is located, is the non-character region, the CPU 210 may form all the dots corresponding to the notice raster line in a distributed manner by both the partial printing SP1 and the partial printing SP2, as the non-character dots.

(3) In the overlap region setting processing (FIGS. 9A and 9B) of the illustrative embodiment, in S340, the number of contact pixels PNa of the downstream side and the number of contact pixels PNb of the upstream side are compared. However, the present disclosure is not limited thereto. For example, the CPU 210 calculates a number of pixels PLa (a length in the conveying direction AR) in the conveying direction AR of a part, which is located in a first adjacent region (for example, the 1-pass region NA2 in FIG. 10) adjacent to the downstream side of the notice overlap region (for example, the overlap region SA2 in FIG. 10), of the notice character region (for example, the character region TA including the characters TX2, in FIG. 10). The CPU 210 calculates a number of pixels PLb in the conveying direction AR of a part, which is located in a second adjacent region (for example, the 1-pass region NA3 in FIG. 10) adjacent to the upstream side of the notice overlap region (for example, the overlap region SA2 in FIG. 10), of the notice character region (for example, the character region TA including the characters TX2, in FIG. 10). In S340, the CPU 210 may compare the number of pixels PLa and the number of pixels PLb. Also in this case, when the number of pixels PLa is equal to or larger than the number of pixels PLb, the processing proceeds to the processing of S335 in FIG. 9A, and when the number of pixels PLa is smaller than the number of pixels PLb, the processing proceeds to the processing of S345 in FIG. 9A. Also, a total number of pixels, which are located in the first adjacent region, of the object pixels (character pixels) in the notice character region may be used instead of the number of pixels PLa, and a total number of pixels, which are located in the second adjacent region, of the object pixels (character pixels) in the notice character region may be used instead of the number of pixels PLb.

(4) In the illustrative embodiment, the rectangular region circumscribing the character TX in the print image PI is specified as the character region TA (FIG. 5). Instead of this configuration, only a region in which the object pixels configuring the character TX are located may be specified as the character region, and a region in which the background pixels indicating a background of the character TX are located may be specified as the non-character object region PA. In this case, for example, when a background of the character TX in the overlap region has a color different from white, the character TX is printed only by the single partial printing, and the background of the character TX is printed by the two partial printings. As a result, it is possible to suppress the character TX from being thickened, and to suppress the banding from being caused in the background of the character TX.

(5) The recording rates R1 to R3 of FIG. 8B in the illustrative embodiment are exemplary and the present disclosure is not limited thereto. For example, the recording rates in the overlap regions SA1 and SA2 may be constant, irrespective of the positions of the overlap regions SA1 and SA2 in the conveying direction AR.

(6) The region specifying processing (FIG. 6) of the illustrative embodiment is exemplary and the present disclosure is not limited thereto. For example, as the region specifying processing, the well-known processing capable of specifying the non-character region and the character region in the RGB image RI and the print image PI may be adopted. For example, a region, which has a feature as a predetermined character, of the region of the determination target may be specified as the character region, and a region having a feature as a photograph may be specified as the non-character object region. The feature as the character may include a feature that the number of colors is smaller than a threshold value and a feature that a ratio of object pixels having a color different from a ground color is smaller than a threshold value TH2, for example. The feature as the photograph may include a feature that the number of colors is larger than a threshold value and a feature that a ratio of object pixels having a color different from the ground color is greater than a threshold value, for example. Here, a well-known method of the region specifying processing is disclosed in JP-A-2013-030090, JP-A-H05-225378, JP-A-2002-288589, and the like, for example.

Also, in the region specifying processing (FIG. 6), for example, when the target image data before the rasterization processing of S20 is described by a predetermined page description language (for example, PostScript), the target image data includes a drawing command including character information indicative of an arrangement position (for example, coordinates) and a size of a character in the RGB image RI and a drawing command including non-character information indicative of an arrangement position and a size of a non-character object. In this case, the CPU 210 may specify the character region and the non-character region in the RGB image RI and the print image PI by using the character information and non-character information included in the target image data.

(7) In the illustrative embodiment, when setting the overlap region having the overlap length Ha (for example, S310 in FIG. 9A), the conveyance amount TV of the sheet conveyance T after the notice partial printing is determined to be the value obtained by subtracting the overlap length Ha from the nozzle length D (TV=D−Ha). Instead of this configuration, the conveyance amount TV may be determined to be a value obtained by subtracting a sum of a predetermined adjusting length a and the overlap length Ha from the nozzle length D (TV=D−(Ha+α)). For example, the predetermined adjusting length a is a small length such as several μms. Thereby, for example, an object value of the conveyance amount TV is set as a value slightly smaller than an ideal conveyance amount. As a result, even when a conveyance error occurs during the actual conveyance, it is possible to suppress an actual conveyance amount from being greater than the ideal conveyance amount. If the actual conveyance amount becomes greater than the ideal conveyance amount, a black stripe is likely to be formed between a region to be printed by the notice partial printing and a region to be printed by the subsequent partial printing and a white stripe is difficult to be formed. If the actual conveyance amount becomes smaller than the ideal conveyance amount, a white strip is likely to be formed between the region to be printed by the notice partial printing and the region to be printed by the subsequent partial printing and a black stripe is difficult to be formed. In general, the white stripe is less acceptable than the black stripe. Therefore, it is not preferable that, when a conveyance error occurs, the actual conveyance amount becomes greater than the ideal conveyance amount. Like this, generally, the conveyance amount TV is preferably determined to be a value obtained by subtracting a length based on the overlap length Ha (for example, the overlap length Ha itself or (Ha+α)) from the nozzle length D.

(8) As the printing medium, a film for OHP, a CD-ROM or a DVD-ROM may be adopted, instead of the sheet S, for example.

(9) In the illustrative embodiment, the printing mechanism 100 is a serial printer including the main scanning unit 130 and configured to drive the printing head 240 for partial printing during the main scanning. Instead of this configuration, the printing mechanism 100 may be a so-called line printer for which the main scanning unit 130 is not provided and a printing head having a plurality of nozzles aligned side by side over the substantially same length as a width of the sheet S in a direction perpendicular to the conveying direction and provided in multiple rows in the conveying direction is instead provided. In the line printer, the printing is executed without executing the main scanning. Also in this case, it is preferable that the partial printing for forming dots by the printing head and the conveyance of the sheet S by the conveyance unit are alternately executed multiple times for printing.

(10) In the printing mechanism 100 of the illustrative embodiment, the conveyance unit 140 is configured to convey the sheet S, thereby moving the sheet S relative to the printing head 110 in the conveying direction AR. Instead of this configuration, the printing head 110 may be moved relative to the fixed sheet S in an opposite direction to the conveying direction AR, so that the sheet S may be moved relative to the printing head 110 in the conveying direction AR.

(11) In the illustrative embodiment, a device functioning as the control device for causing the printing mechanism 100 as the printing execution unit to execute the printing processing of FIG. 4 is the CPU 210. Instead of this configuration, the device functioning as the control device may be other device, for example, a user's terminal device (not shown). In this case, for example, the terminal device is configured to operate as a printer driver by executing a driver program, and to control a printer as the printing execution unit to execute the printing processing of FIG. 4, as a part of functions of the printer driver. In this case, the terminal device is configured to supply a printing job, which is generated using print image data, to the printer and to cause the printer to execute the printing processing.

As can be seen from the above descriptions, in the illustrative embodiment, the printing mechanism 100 is an example of the printing execution unit, and when the terminal device executes the printing processing, the whole printer configured to execute the printing is an example of the printing execution unit.

Also, the control device for causing the printer to execute the printing processing of FIG. 4 may be a server configured to acquire the image data from the printer or the terminal device and to generate the printing job by using the acquired image data, for example. The server may be a plurality of computing devices capable of performing communication with each other via a network. In this case, the plurality of entire computing devices capable of performing communication with each other via the network is an example of the control device.

(12) In the illustrative embodiment, a part of the configurations implemented by the hardware may be replaced with software, and a part or all of the configurations implemented by the software may be replaced with hardware. For example, a part of the processing that is to be executed by the CPU 210 of the printer 200 of FIG. 1 may be implemented by a dedicated hardware circuit.

Although the present disclosure has been described with reference to the illustrative embodiment and the modified embodiments thereof, the embodiments are provided so as to easily understand the present disclosure, not to limit the present disclosure. The present disclosure can be changed and improved without departing from the gist and the claims, and the equivalents thereof are included in the present disclosure.

What is claimed is:

1. A control device for a printing execution unit including: a printing head including a plurality of nozzles configured to discharge ink; a head drive unit configured to cause the printing head to discharge the ink and to form dots on a printing medium; and a movement unit configured to move the printing medium relative to the printing head in a moving direction, the control device comprising:

a controller configured to perform:
acquiring target image data;
specifying a character region indicative of a character in a print image based on the target image data; and
causing the printing execution unit to print the print image by using the target image data, the print image being printed by alternately executing, for a plurality of times, (i) a partial printing in which dots are formed by the printing head performing a main scanning and (ii) moving of the printing medium by the movement unit, and the plurality of times of the partial printings including a first partial printing and a second partial printing,
wherein the printing execution unit is caused to print the print image by:
executing the first partial printing;
moving the printing medium by a first movement amount after the first partial printing has been executed; and
executing the second partial printing after the printing medium has been moved by the first movement amount,
wherein dots, including a plurality of character dots and a plurality of non-character dots, are formed in an overlap region defining an overlap between the first partial printing and the second partial printing, the overlap region including an upstream end, in the moving direction, of a partial region which is configured to be printed by the first partial printing, and
wherein, in a case where the character region and a non-character region different from the character region are included in the overlap region, the printing execution unit is caused to print the print image by:
forming the plurality of character dots, which are dots in the character region included in the overlap region, by one of the first partial printing and the second partial printing, and not forming the plurality of character dots by another of the first partial printing and the second partial printing; and
forming some of the plurality of non-character dots, which are dots in the non-character region included in the overlap region, by the first partial printing, and forming other dots of the plurality of non-character dots by the second partial printing.

2. The control device according to claim 1,
wherein the overlap region includes a specific raster line including a plurality of pixels in a direction perpendicular to the moving direction, the plurality of pixels corresponding to two or more of the plurality of character dots and two or more of the plurality of non-character dots,
wherein the printing execution unit is caused to print the print image by:
forming the two or more of the plurality of character dots corresponding to the plurality of pixels in the specific raster line by the one of the first partial printing and the second partial printing and not forming the two or more of the plurality of character dots corresponding to the plurality of pixels in the specific raster line by the other of the first partial printing and the second partial printing; and
forming some of the two or more of the plurality of non-character dots corresponding to the plurality of pixels in the specific raster line by the first partial printing and forming other of the two or more of the plurality of non-character dots corresponding to the plurality of pixels in the specific raster line by the second partial printing.

3. The control device according to claim 1,
wherein the overlap region and a first adjacent region is configured to be printed by the first partial printing, the first adjacent region being adjacent to a downstream side of the overlap region with respect to the moving direction,
wherein the overlap region and a second adjacent region is configured to be printed by the second partial printing, the second adjacent region being adjacent to an upstream side of the overlap region with respect to the moving direction,
wherein the character region includes a specific character region,
wherein, in a case where the specific character region is arranged in the overlap region and the first adjacent region and is not arranged in the second adjacent region, the printing execution unit is caused to print the print image by forming a plurality of the character dots in the specific character region by the first partial printing, and
wherein, in a case where the specific character region is arranged in the overlap region and the second adjacent region and is not arranged in the first adjacent region, the printing execution unit is caused to print the print image by forming the plurality of character dots in the specific character region by the second partial printing.

4. The control device according to claim 1,
wherein the overlap region and a first adjacent region is configured to be printed by the first partial printing, the first adjacent region being adjacent to a downstream side of the overlap region with respect to the moving direction,
wherein the overlap region and a second adjacent region is configured to be printed by the second partial printing, the second adjacent region being adjacent to an upstream side of the overlap region with respect to the moving direction,
wherein the character region includes a specific character region,
wherein the controller is configured to further perform:
calculating, in a case where the specific character region is arranged in the overlap region, the first adjacent region, and the second adjacent region, a number of first pixels which are in the specific character region and relate to the first adjacent region and a number of second pixels which are in the specific character region and relate to the second adjacent region,
wherein, in a case where the number of first pixels is equal to or larger than the number of second pixels, the printing execution unit is caused to print the print image by forming a plurality of the character dots in the specific character region by the first partial printing, and
wherein, in a case where the number of first pixels is smaller than the number of second pixels, the printing execution unit is caused to print the print image by forming the plurality of character dots in the specific character region by the second partial printing.

5. The control device according to claim 1,
wherein the overlap region and a first adjacent region is configured to be printed by the first partial printing, the first adjacent region being adjacent to a downstream side of the overlap region with respect to the moving direction,
wherein the overlap region and a second adjacent region is configured to be printed by the second partial printing, the second adjacent region being adjacent to an upstream side of the overlap region with respect to the moving direction,
wherein the controller is configured to further perform:
acquiring pattern data defining a distribution pattern in which a plurality of dots in the overlap region are distributed into first dots to be formed by the first partial printing and second dots to be formed by the second partial printing, wherein, in the distribution pattern, a ratio of dots being distributed into the first dots increases as a position, in the moving direction, of the dots being distributed becomes closer to the first adjacent region, and
wherein the printing execution unit is caused to print the print image by:
forming the plurality of character dots only by one of the first partial printing and the second partial printing, irrespective of the distribution pattern defined by the pattern data; and
forming some of the plurality of non-character dots by the first partial printing and forming other of the plurality of non-character dots by the second partial printing, in accordance with the distribution pattern defined by the pattern data.

6. The control device according to claim 1,
wherein the controller is configured to further perform:
specifying a non-character object region indicative of an object different from a character in the print image,
wherein, in a case where the non-character object region is located at an upstream end of the partial region with respect to the moving direction, the printing execution unit is caused to print the print image by:
executing the first partial printing;
moving the printing medium by the first movement amount after the first partial printing has been executed;
executing the second partial printing after the printing medium has been moved by the first movement amount; and
forming the dots in the overlap region, which includes the upstream end, in the moving direction, of the partial region, by both the first partial printing and the second partial printing, and
wherein, in a case where the non-character object region is not located at the upstream end of the partial region and the character region is located at the upstream end of the partial region, the printing execution unit is caused to print the print image by:
executing the first partial printing;
moving the printing medium by a second movement amount greater than the first movement amount after the first partial printing has been executed; and
executing the second partial printing after the printing medium has been moved by the second movement amount, the dots in the partial region not being formed during the second partial printing.

7. The control device according to claim 1,
wherein the controller is configured to further perform:
distributing a plurality of pixels in a target image based on the target image data into a plurality of object pixels and a plurality of background pixels, and wherein, in a case where a ratio of the object pixels occupying a determination target region in the target image is less than a threshold value, the determination target region is specified as the character region.

8. The control device according to claim 1,
wherein the printing execution unit further includes a main scanning unit configured to execute a main scanning of moving the printing head in a main scanning direction intersecting with the moving direction, and
wherein the head drive unit is configured to execute the partial printing by causing the printing head to form the dots during the main scanning.

9. A printing apparatus comprising:
the control device according to claim 1; and
the printing execution unit.

10. A non-transitory computer readable storage medium storing a program for controlling a printing execution unit including: a printing head including a plurality of nozzles configured to discharge ink; a head drive unit configured to cause the printing head to discharge the ink and to form dots on a printing medium; and a movement unit configured to move the printing medium relative to the printing head in a moving direction, the program, when executed by a computer of a control device, causing the control device to perform:
acquiring target image data;
specifying a character region indicative of a character in a print image based on the target image data; and
causing the printing execution unit to print the print image by using the target image data, the print image being printed by alternately executing, for a plurality of times, (i) a partial printing in which dots are formed by the printing head performing a main scanning and (ii) moving of the printing medium by the movement unit, and the plurality of times of the partial printings including a first partial printing and a second partial printing,
wherein the printing execution unit is caused to print the print image by:
executing the first partial printing;
moving the printing medium by a first movement amount after the first partial printing has been executed; and
executing the second partial printing after the printing medium has been moved by the first movement amount,
wherein dots, including a plurality of character dots and a plurality of non-character dots, are formed in an overlap region defining an overlap between the first partial printing and the second partial printing, the overlap region including an upstream end, in the moving direction, of a partial region which is configured to be printed by the first partial printing, and
wherein, in a case where the character region and a non-character region different from the character region are included in the overlap region, the printing execution unit is caused to print the print image by:
forming the plurality of character dots, which are dots in the character region included in the overlap region, by one of the first partial printing and the second partial printing, and not forming the plurality of character dots by another of the first partial printing and the second partial printing; and
forming some of the plurality of non-character dots, which are dots in the non-character region included in the overlap region, by the first partial printing, and forming other dots of the plurality of non-character dots by the second partial printing.

11. The storage medium according to claim 10,
wherein the overlap region includes a specific raster line including a plurality of pixels in a direction perpendicular to the moving direction, the plurality of pixels corresponding to two or more of the plurality of character dots and two or more of the plurality of non-character dots,
wherein the printing execution unit is caused to print the print image by:
forming the two or more of the plurality of character dots corresponding to the plurality of pixels in the specific raster line by the one of the first partial printing and the second partial printing and not forming the two or more of the plurality of character dots corresponding to the plurality of pixels in the specific raster line by the other of the first partial printing and the second partial printing; and
forming some of the two or more of the plurality of non-character dots corresponding to the plurality of pixels in the specific raster line by the first partial printing and forming other of the two or more of the plurality of non-character dots corresponding to the plurality of pixels in the specific raster line by the second partial printing.

12. The storage medium according to claim 10,
wherein the overlap region and a first adjacent region is configured to be printed by the first partial printing, the first adjacent region being adjacent to a downstream side of the overlap region with respect to the moving direction,
wherein the overlap region and a second adjacent region is configured to be printed by the second partial printing, the second adjacent region being adjacent to an upstream side of the overlap region with respect to the moving direction,
wherein the character region includes a specific character region,
wherein, in a case where the specific character region is arranged in the overlap region and the first adjacent region and is not arranged in the second adjacent region, the printing execution unit is caused to print the print image by forming a plurality of the character dots in the specific character region by the first partial printing, and
wherein, in a case where the specific character region is arranged in the overlap region and the second adjacent region and is not arranged in the first adjacent region, the printing execution unit is caused to print the print image by forming the plurality of character dots in the specific character region by the second partial printing.

13. The storage medium according to claim 10,
wherein the overlap region and a first adjacent region is configured to be printed by the first partial printing, the first adjacent region being adjacent to a downstream side of the overlap region with respect to the moving direction,
wherein the overlap region and a second adjacent region is configured to be printed by the second partial printing, the second adjacent region being adjacent to an upstream side of the overlap region with respect to the moving direction,
wherein the character region includes a specific character region, wherein the program, when executed by the computer of the control device, causes the control device to further perform:

calculating, in a case where the specific character region is arranged in the overlap region, the first adjacent region, and the second adjacent region, a number of first pixels which are in the specific character region and relate to the first adjacent region and a number of second pixels which are in the specific character region and relate to the second adjacent region, wherein, in a case where the number of first pixels is equal to or larger than the number of second pixels, the printing execution unit is caused to print the print image by forming a plurality of the character dots in the specific character region by the first partial printing, and wherein, in a case where the number of first pixels is smaller than the number of second pixels, the printing execution unit is caused to print the print image by forming the plurality of character dots in the specific character region by the second partial printing.

14. The storage medium according to claim 10, wherein the overlap region and a first adjacent region is configured to be printed by the first partial printing, the first adjacent region being adjacent to a downstream side of the overlap region with respect to the moving direction, wherein the overlap region and a second adjacent region is configured to be printed by the second partial printing, the second adjacent region being adjacent to an upstream side of the overlap region with respect to the moving direction, wherein the program, when executed by the computer of the control device, causes the control device to further perform:

acquiring pattern data defining a distribution pattern in which a plurality of dots in the overlap region are distributed into first dots to be formed by the first partial printing and second dots to be formed by the second partial printing, wherein, in the distribution pattern, a ratio of dots being distributed into the first dots increases as a position, in the moving direction, of the dots being distributed becomes closer to the first adjacent region, and wherein the printing execution unit is caused to print the print image by:

forming the plurality of character dots only by one of the first partial printing and the second partial printing, irrespective of the distribution pattern defined by the pattern data; and forming some of the plurality of non-character dots by the first partial printing and forming other of the plurality of non-character dots by the second partial printing, in accordance with the distribution pattern defined by the pattern data.

15. The storage medium according to claim 10, wherein the program, when executed by the computer of the control device, causes the control device to further perform:

specifying a non-character object region indicative of an object different from a character in the print image, wherein, in a case where the non-character object region is located at an upstream end of the partial region with respect to the moving direction, the printing execution unit is caused to print the print image by:

executing the first partial printing;

moving the printing medium by the first movement amount after the first partial printing has been executed;

executing the second partial printing after the printing medium has been moved by the first movement amount; and forming the dots in the overlap region, which includes the upstream end, in the moving direction, of the partial region, by both the first partial printing and the second partial printing, and wherein, in a case where the non-character object region is not located at the upstream end of the partial region and the character region is located at the upstream end of the partial region, the printing execution unit is caused to print the print image by:

executing the first partial printing;

moving the printing medium by a second movement amount greater than the first movement amount after the first partial printing has been executed; and executing the second partial printing after the printing medium has been moved by the second movement amount, the dots in the partial region not being formed during the second partial printing.

16. The storage medium according to claim 10, wherein the program, when executed by the computer of the control device, causes the control device to further perform:

distributing a plurality of pixels in a target image based on the target image data into a plurality of object pixels and a plurality of background pixels, and wherein, in a case where a ratio of the object pixels occupying a determination target region in the target image is less than a threshold value, the determination target region is specified as the character region.

17. The storage medium according to claim 10, wherein the printing execution unit further includes a main scanning unit configured to execute a main scanning of moving the printing head in a main scanning direction intersecting with the moving direction, and wherein the head drive unit is configured to execute the partial printing by causing the printing head to form the dots during the main scanning.

18. A printing method for a printing execution unit including: a printing head including a plurality of nozzles configured to discharge ink; a head drive unit configured to cause the printing head to discharge the ink and to form dots on a printing medium; and a movement unit configured to move the printing medium relative to the printing head in a moving direction, the printing method including:

acquiring target image data;

specifying a character region indicative of a character in a print image based on the target image data; and causing the printing execution unit to print the print image by using the target image data, the print image being printed by alternately executing, for a plurality of times, (i) a partial printing in which dots are formed by the printing head performing a main scanning and (ii) moving of the printing medium by the movement unit, and the plurality of times of the partial printings including a first partial printing and a second partial printing, wherein the printing execution unit is caused to print the print image by:
executing the first partial printing;
moving the printing medium by a first movement amount after the first partial printing has been executed; and
executing the second partial printing after the printing medium has been moved by the first movement amount,
wherein dots, including a plurality of character dots and a plurality of non-character dots, are formed in an overlap region defining an overlap between the first partial printing and the second partial printing, the overlap region including an upstream end, in the moving direction, of a partial region which is configured to be printed by the first partial printing, and
wherein, in a case where the character region and a non-character region different from the character region are included in the overlap region, the printing execution unit is caused to print the print image by:
forming the plurality of character dots, which are dots in the character region included in the overlap region, by one of the first partial printing and the second partial printing, and not forming the plurality of character dots by another of the first partial printing and the second partial printing; and
forming some of the plurality of non-character dots, which are dots in the non-character region included in the overlap region, by the first partial printing, and
forming other dots of the plurality of non-character dots by the second partial printing.

\* \* \* \* \*